(12) United States Patent
Ito

(10) Patent No.: US 12,515,191 B2
(45) Date of Patent: Jan. 6, 2026

(54) PARTICULATE WATER-ABSORBENT RESIN COMPOSITION

(71) Applicant: SUMITOMO SEIKA CHEMICALS CO., LTD., Hyogo (JP)

(72) Inventor: Takashi Ito, Himeji (JP)

(73) Assignee: SUMITOMO SEIKA CHEMICALS CO., LTD., Hyogo (JP)

( * ) Notice: Subject to any disclaimer, the term of this patent is extended or adjusted under 35 U.S.C. 154(b) by 843 days.

(21) Appl. No.: 17/597,323

(22) PCT Filed: Jul. 2, 2020

(86) PCT No.: PCT/JP2020/026047
§ 371 (c)(1),
(2) Date: Jan. 3, 2022

(87) PCT Pub. No.: WO2021/006178
PCT Pub. Date: Jan. 14, 2021

(65) Prior Publication Data
US 2022/0314194 A1    Oct. 6, 2022

(30) Foreign Application Priority Data

Jul. 5, 2019 (JP) .................................. 2019-126351
Sep. 9, 2019 (JP) .................................. 2019-163909

(51) Int. Cl.
*B01J 20/02* (2006.01)
*A61F 13/49* (2006.01)
(Continued)

(52) U.S. Cl.
CPC ..... *B01J 20/0233* (2013.01); *A61F 13/49007* (2013.01); *A61F 13/53* (2013.01);
(Continued)

(58) Field of Classification Search
CPC .. B01J 20/0233; B01J 20/267; B01J 2220/46; B01J 2220/68; A61F 13/49007; A61F 13/53; A61L 15/18; A61L 15/22; A61L 15/42; A61L 15/46; A61L 15/60; A61L 2300/10; A61L 2300/102; A61L 2300/104;
(Continued)

(56) References Cited

U.S. PATENT DOCUMENTS

2006/0189953 A1* 8/2006 Taniguchi ........... A61F 13/8405
521/50
2007/0111004 A1* 5/2007 Handa ..................... A61L 15/18
428/411.1

FOREIGN PATENT DOCUMENTS

CN  104403249  3/2015
CN  104645406  5/2015
(Continued)

OTHER PUBLICATIONS

International Preliminary Report on Patentability of PCT/JP2020/026047, Jan. 20, 2022, 5 pages.
(Continued)

*Primary Examiner* — Brian A Mccaig
(74) *Attorney, Agent, or Firm* — HSML P.C.

(57) ABSTRACT

Disclosed is a particulate water-absorbent resin composition containing at least one selected from the group consisting of a microporous inorganic material, silver, and a silver compound, and a polymer particle, in which the polymer particle contains an inorganic reducing agent.

13 Claims, 2 Drawing Sheets

(51) Int. Cl.
*A61F 13/53* (2006.01)
*A61L 15/18* (2006.01)
*A61L 15/22* (2006.01)
*A61L 15/46* (2006.01)
*B01J 20/26* (2006.01)

(52) U.S. Cl.
CPC .............. *A61L 15/18* (2013.01); *A61L 15/22* (2013.01); *A61L 15/46* (2013.01); *B01J 20/267* (2013.01); *A61F 2013/530671* (2013.01); *B01J 2220/46* (2013.01); *B01J 2220/68* (2013.01)

(58) Field of Classification Search
CPC .......... C08K 3/01; C08K 3/013; C08K 3/015; C08K 3/08; C08K 3/16; C08K 3/22; C08K 3/32; C08K 7/24
See application file for complete search history.

(56) References Cited

FOREIGN PATENT DOCUMENTS

| | | |
|---|---|---|
| CN | 107556500 | 1/2018 |
| CN | 108752525 | 11/2018 |
| EP | 0441975 | 8/1991 |
| EP | 1577349 | 9/2005 |
| EP | 2905071 | 8/2015 |
| EP | 3127606 | 2/2017 |
| JP | S61-194001 | 8/1986 |
| JP | H7-053884 | 2/1995 |
| JP | H9-030901 | 2/1997 |
| JP | H11-148023 | 6/1999 |
| JP | 2004-346089 | 12/2004 |
| JP | 2005-194376 | 7/2005 |
| JP | 2009-072421 | 4/2009 |
| KR | 10-2004-0014490 | 2/2004 |
| KR | 10-2008-0069661 | 7/2008 |
| WO | 03/002089 | 1/2003 |
| WO | 2005/005549 | 1/2005 |
| WO | 2006/046496 | 5/2006 |
| WO | 2011/040530 | 4/2011 |
| WO | 2015/152299 | 10/2015 |

OTHER PUBLICATIONS

International Search Report of PCT/JP2020/026047, Sep. 15, 2020, 2 pages.

* cited by examiner

PARTICULATE WATER-ABSORBENT RESIN COMPOSITION

TECHNICAL FIELD

The present invention relates to a particulate water-absorbent resin composition.

BACKGROUND ART

Water-absorbent resins have been used in the field of sanitary products, and have been used as materials for absorbent bodies contained in absorbent articles such as diapers. Patent Document 1 discloses a water-absorbent resin composition containing a water-absorbent resin, an antibacterial agent containing a porous material having an antibacterial metal carried thereon, and a metal chelating agent.

CITATION LIST

Patent Literature

Patent Document 1: Japanese Unexamined Patent Publication No. 2004-346089

SUMMARY OF INVENTION

Technical Problem

When a long time has passed after the particulate water-absorbent resin compositions (water-absorbent resin particles) contained in a sanitary product absorb a metal ion-containing liquid such as urine and are gelated, the gel may deteriorate. Since the deteriorated gel easily causes syneresis, the deteriorated gel may cause leakage and may cause rough skin of the user.

An object of the present invention is to provide a particulate water-absorbent resin composition having excellent gel stability after absorbing a metal ion-containing liquid, such as urine.

Solution to Problem

A particulate water-absorbent resin composition according to the present invention comprises at least one selected from the group consisting of a microporous inorganic material, silver, and a silver compound, and polymer particles, in which the polymer particles contain an inorganic reducing agent.

It is preferable that the particulate water-absorbent resin composition comprises the microporous inorganic material, and the microporous inorganic material comprises at least one of zeolite or zirconium phosphate.

It is preferable that the particulate water-absorbent resin composition comprises the microporous inorganic material, and the microporous inorganic material comprises an antibacterial metal.

It is preferable that the particulate water-absorbent resin composition comprises the silver or the silver compound, and the silver or the silver compound is at least one selected from the group consisting of silver powder, silver (I) chloride, and silver (I) oxide.

It is preferable that in the particulate water-absorbent resin composition, the inorganic reducing agent is contained inside the polymer particles.

The present invention also provides an absorbent body containing the particulate water-absorbent resin composition.

The present invention also provides an absorbent article comprising the absorbent body.

The absorbent article may be a diaper.

Advantageous Effects of Invention

According to the present invention, a particulate water-absorbent resin composition having excellent gel stability after absorbing a metal ion-containing liquid such as urine is provided.

DESCRIPTION OF EMBODIMENTS

Figure 1:
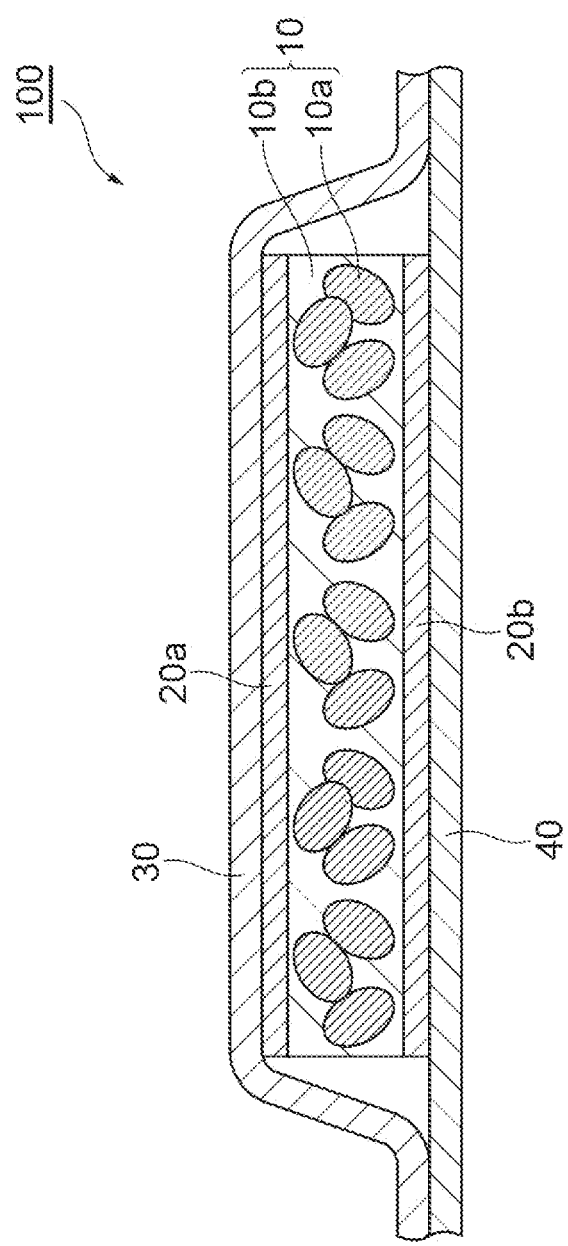
FIG. 1 is a cross-sectional view showing an example of an absorbent article.

Hereinafter, embodiments of the present invention will be described in detail. However, the present invention is not limited to the following embodiments, and can be variously modified and implemented within the scope of the gist thereof.

In the present specification, "acryl" and "methacryl" are collectively referred to as "(meth)acryl". Similarly, "acrylate" and "methacrylate" are also referred to as "(meth)acrylate". "(Poly)" means both of a case where there is a prefix of "poly" and a case where there is no prefix of "poly". In the numerical value ranges described in a stepwise manner in the present specification, an upper limit value or a lower limit value of a numerical value range in a certain stage can be arbitrarily combined with an upper limit value or a lower limit value of a numerical value range in another stage. In a numerical value range described in the present specification, an upper limit value or a lower limit value of the numerical value range may be replaced with the value shown in the examples. "Water soluble" means that a material exhibits a solubility in water of 5% by mass or more at 25° C. Materials exemplified in the present specification may be used alone or may be used in combination of two or more thereof. The content of each component in the composition means the total amount of a plurality of substances present in the composition in a case where the plurality of substances corresponding to each component are present in the composition, unless otherwise specified. "Physiological saline solution" refers to a 0.9% by mass sodium chloride aqueous solution.

The particulate water-absorbent resin composition according to the present embodiment includes at least one selected from the group consisting of a microporous inorganic material, silver, and a silver compound, and polymer particles, and the polymer particles contain an inorganic reducing agent. Since the particulate water-absorbent resin composition according to the present embodiment has this configuration, a swollen gel formed after the particulate water-absorbent resin composition absorbs a metal ion-containing liquid such as urine is less likely to deteriorate for a long period of time and has excellent stability.

The particulate water-absorbent resin composition according to the first embodiment includes a microporous inorganic material and polymer particles, and the polymer particles contain an inorganic reducing agent.

Microporous Inorganic Material

The microporous inorganic material used in the particulate water-absorbent resin composition according to the first embodiment may be a natural product or a synthetic product. The microporous inorganic material preferably has a property of adsorbing cations. Examples of the microporous inorganic material include zeolite, magnesium aluminate metasilicate, zirconium phosphate, calcium phosphate (apatite), sepiolite (hydrated magnesium silicate), montmorillonite (silicate mineral), and calcium silicate. Among these, from the viewpoint of easily enhancing gel stability, zeolite and/or zirconium phosphate is suitably used.

The particle diameter of the microporous inorganic material may be, for example, 0.5 μm to 10 μm or 0.7 μm to 5 μm.

The content of the microporous inorganic material in the particulate water-absorbent resin composition according to the first embodiment may be, for example, 0.001 to 3 parts by mass and is preferably is 0.01 to 1 part by mass, more preferably 0.01 to 0.5 parts by mass, and even more preferably 0.01 to 0.1 parts by mass, with respect to 100 parts by mass of the polymer particles. It is preferable that the content of the microporous inorganic material is 0.001 parts by mass or more with respect to 100 parts by mass of the polymer particles since the gel stability can be further enhanced, and it is preferable that the content of the microporous inorganic material is 3 parts by mass or less from the viewpoint of economic efficiency.

The content of the microporous inorganic material in the particulate water-absorbent resin composition according to the first embodiment may be, for example, 0.001% to 3% by mass, and is preferably 0.01% to 1% by mass, more preferably 0.01% to 0.5% by mass, and preferably 0.01% to 0.1% by mass, with respect to the total amount of the particulate water-absorbent resin composition.

The microporous inorganic material may include an antibacterial metal. The antibacterial metal may be, for example, silver, zinc, copper or the like, and is preferably silver or zinc, and more preferably a combination of silver and zinc. Further, the antibacterial metal is preferably carried on the microporous inorganic material in an ion state.

That is, the microporous inorganic material preferably includes antibacterial metal ions. The antibacterial metal ion may be, for example, a silver ion, a zinc ion, a copper ion or the like.

When the microporous inorganic material includes the antibacterial metal, the amount of the antibacterial metal in the microporous inorganic material may be, for example, 0.1% to 20% by mass with respect to the total amount of the microporous inorganic material.

The microporous inorganic material may be arranged inside the polymer particles or may be arranged on the surface of the polymer particles. From the viewpoint of enhancing gel stability, the microporous inorganic material is preferably arranged on the surface of the polymer particles. The microporous inorganic material may be added, for example, when polymerizing the monomers constituting the polymer particles, and may be added to the polymer particles by being mixed with the polymer particles obtained by the polymerization in a dry state. The microporous inorganic material is preferably added to the polymer particles by being mixed with the polymer particles in a dry state. The particulate water-absorbent resin composition may be a water-absorbent resin particle in which the microporous inorganic material is integrated with the polymer particle to form one particle.

The particulate water-absorbent resin composition according to a second embodiment includes silver or a silver compound, and polymer particles, and the polymer particles contain an inorganic reducing agent.

Silver/Sliver Compound

The silver or the silver compound may be, for example, silver powder, silver (I) chloride, silver (I) oxide or the like. Among these, at least one selected from the group consisting of silver powder, silver (I) chloride, and silver (I) oxide is preferable from the viewpoint of enhancing safety and gel stability. The silver or the silver compound may be used alone or may be used in combination of two or more thereof.

As the silver or the silver compound, for example, a powder form can be used. The particle diameter of the silver or the silver compound may be, for example, 1 μm or more, 5 μm or more, 10 μm or more, or 30 μm or more, and may be 3 mm or less, 2 mm or less, 1 mm or less, or 850 μm or less. The particle diameter of the silver or the silver compound is preferably 30 μm to 850 μm.

The silver or the silver compound may be carried on the microporous inorganic material. That is, the particulate water-absorbent resin composition may include a microporous inorganic material that carries silver or a silver compound. Examples of the microporous inorganic material include zeolite, magnesium aluminate metasilicate, zirconium phosphate, calcium phosphate (apatite), sepiolite (hydrated magnesium silicate), montmorillonite (silicate mineral), and calcium silicate. The particulate water-absorbent resin composition according to the second embodiment may contain a microporous inorganic material that does not carry silver or a silver compound.

The particle diameter of the microporous inorganic material may be, for example, 0.5 μm to 10 μm or 0.7 μm to 5 μm. In a case where the particulate water-absorbent resin composition includes a microporous inorganic material, the content of the microporous inorganic material may be, for example, 0.001 to 3 parts by mass, and is preferably 0.01 to 1 part by mass, more preferably 0.01 to 0.5 parts by mass, and even more preferably 0.01 to 0.1 parts by mass, with respect to 100 parts by mass of the polymer particles. The content of the microporous inorganic material may be, for example, 0.001% to 3% by mass, and is preferably 0.01% to 1% by mass, more preferably 0.01% to 0.5% by mass, and preferably 0.01% to 0.1% by mass, with respect to the total amount of the particulate water-absorbent resin composition.

The content of the silver element in the particulate water-absorbent resin composition according to the second embodiment may be, for example, 0.0001% to 3% by mass, and is preferably 0.0002% to 1% by mass, more preferably 0.0005% to 0.5% by mass, and preferably 0.01% to 0.1% by mass, with respect to the total amount of the polymer particles. It is preferable that the total content of the silver element is 0.0001 parts by mass or more with respect to 100 parts by mass of the polymer particles since the gel stability can be further enhanced, and it is preferable that the total content is 3 parts by mass or less from the viewpoint of economic efficiency.

The silver or the silver compound and the polymer particles may be integrated to form one particle (water-absorbent resin particle), or may be separated from each other. In a case where the silver or the silver compound and the polymer particles are integrated to form a water-absorbent resin particle, the silver or the silver compound may be arranged inside the polymer particles and may be arranged on the surface of the polymer particles. The silver or the silver compound may be added, for example, when polymerizing monomers constituting the polymer particles, or may be added to the polymer particles by being mixed with the polymer particles obtained by polymerization in a dry state. The silver or the silver compound is preferably added to the polymer particles by being mixed with the polymer particles in a dry state.

Inorganic Reducing Agent

The polymer particles included in the particulate water-absorbent resin composition according to the present embodiment (including the first embodiment and the second embodiment, the same applies below) contain an inorganic reducing agent. In the present specification, the inorganic reducing agent means an inorganic compound having reducibility. The inorganic reducing agent may have a reducing inorganic element, and specific examples thereof include a compound having a reducing sulfur atom or a reducing phosphorus atom, and preferably a compound containing a reducing sulfur atom or a water soluble compound containing a reducing phosphorus atom.

Examples of the inorganic reducing agent containing a sulfur atom include sulfites such as sodium sulfite, potassium sulfite, calcium sulfite, zinc sulfite, and ammonium sulfite; hydrogen sulfites such as sodium hydrogen sulfite, potassium hydrogen sulfite, calcium hydrogen sulfite, and ammonium hydrogen sulfite; pyrosulfites such as sodium pyrosulfite, potassium pyrosulfite, and ammonium pyrosulfite; dithionites such as sodium dithionite, potassium dithionite, ammonium dithionite, calcium dithionite, and zinc dithionite; trithionates such as potassium trithionate, and sodium trithionate; tetrathionates such as potassium tetrathionate, and sodium tetrathionate; and thiosulfates such as sodium thiosulfate, potassium thiosulfate, and ammonium thiosulfate. Examples of the inorganic reducing agent containing a phosphorus atom include sodium hypophosphite.

Among these, as the inorganic reducing agent, sulfites, hydrogen sulfites, pyrosulfites, or dithionites are preferable, and sodium sulfite or sodium hydrogen sulfite is more preferable. The inorganic reducing agent may be used alone or may be used in combination of two or more thereof.

The inorganic reducing agent may be arranged inside the polymer particles, on the surface of the polymer particles, or both thereof. From the viewpoint of enhancing gel stability, the inorganic reducing agent is preferably contained inside the polymer particles. Examples of a method of containing the inorganic reducing agent inside the polymer particles include a method of adding the inorganic reducing agent before or during polymerization of a monomer, and a method of adding the inorganic reducing agent before or during a step of drying a hydrogel-iike polymer obtained by polymerization of a monomer. In particular, it is preferable to add an aqueous solution of the inorganic reducing agent during drying of a hydrogel-like polymer obtained by polymerization of a monomer and before a surface crosslinking step.

The timing of adding the inorganic reducing agent is preferably when the water content of the hydrogel-like polymer is 5% to 70% by mass, more preferably when the water content is 10% to 60% by mass, and even more preferably when the water content is 36% to 50% by mass. The water content of the hydrogel-like polymer will be described later.

The content of the inorganic reducing agent may be, for example, 0.001% to 1% by mass, and is preferably 0.001% to 0.5% by mass, more preferably 0.003% to 0.1% by mass, and even more preferably 0.005% to 0.06% by mass with respect to the total amount of the polymer particles. When the content of the inorganic reducing agent is 0.001 parts by mass or more with respect to the total amount of the polymer particles, the gel stability after absorbing the metal ion-containing liquid such as urine is further enhanced, which is preferable. When the content of the inorganic reducing agent is 1 part by mass or less with respect to the total amount of the polymer particles, the water absorption performance can be enhanced, which is preferable.

The content of the inorganic reducing agent in the first embodiment may be, for example, 0.001% to 1% by mass, and is preferably 0.001% to 0.5% by mass, more preferably 0.003% to 0.1% by mass, and even more preferably 0.005% to 0.06% by mass with respect to the total amount of the water-absorbent resin particles.

Polymer Particle

The polymer particle may be, for example, a crosslinking polymer obtained by polymerizing a monomer containing an ethylenically unsaturated monomer. The crosslinking polymer of the ethylenically unsaturated monomer has a structural unit derived from the ethylenically unsaturated monomer and can be obtained by polymerizing a monomer containing the ethylenically unsaturated monomer. That is, the polymer particle can contain a polymer having a structural unit derived from an ethylenically unsaturated monomer. As the ethylenically unsaturated monomer, a water soluble ethylenically unsaturated monomer can be used. Examples of the polymerization method include a reverse phase suspension polymerization method, an aqueous solution polymerization method, a bulk polymerization method, and a precipitation polymerization method. Among these, the reverse phase suspension polymerization method or the aqueous solution polymerization method is preferable from the viewpoint of ensuring good water-absorbent characteristics of the obtained particulate water-absorbent resin composition and facilitating control of the polymerization reaction. In the following, as a method of polymerizing an ethylenically unsaturated monomer, a reverse phase suspension polymerization method will be described as an example.

The ethylenically unsaturated monomer is preferably water soluble, and examples thereof include (meth)acrylic acid and a salt thereof, 2-(meth)acrylamide-2-methylpropanesulfonic acid and a salt thereof, (meth)acrylamide, N,N-dimethyl (meth)acrylamide, 2-hydroxyethyl (meth)acrylate, N-methylol (meth)acrylamide, polyethylene glycol mono(meth)acrylate, N,N-diethylaminoethyl (meth)acrylate, N,N-diethylaminopropyl (meth)acrylate, and diethylaminopropyl (meth)acrylamide. In a case where the ethylenically unsaturated monomer has an amino group, the amino group may be quaternized. The ethylenically unsaturated monomer may be used alone or may be used in combination of two or more thereof. Functional groups such as a carboxyl group and an amino group of the above-mentioned monomers can function as functional groups capable of crosslinking in a surface crosslinking step to be described later.

Among these, from the viewpoint of industrial availability, the ethylenically unsaturated monomer preferably includes at least one compound selected from the group consisting of (meth)acrylic acid and a salt thereof, acrylamide, methacrylamide, and N,N-dimethylacrylamide, and more preferably includes at least one compound selected from the group consisting of (meth)acrylic acid and a salt thereof, and acrylamide.

From the viewpoint of further enhancing the water-absorbent characteristics, the ethylenically unsaturated monomer even more preferably includes at least one compound selected from the group consisting of (meth)acrylic acid and a salt thereof. That is, the polymer particles preferably have a structural unit derived from at least one selected from the group consisting of (meth)acrylic acid and a salt thereof.

As the monomer for obtaining the polymer particles, a monomer other than the above-mentioned ethylenically unsaturated monomer may be used. Such a monomer can be used by mixing with an aqueous solution containing the above-mentioned ethylenically unsaturated monomer, for example. The amount of the ethylenically unsaturated monomer used may be 70 to 100 mol %, 80 to 100 mol %, 90 to 100 mol %, 95 to 100 mol % or 100 mol % with respect to the total amount of the monomer (the total amount of the monomer for obtaining the polymer particles, for example, the total amount of monomers that provide the structural unit of the crosslinking polymer, the same applies hereinafter). Among these, the ratio of (meth)acrylic acid and a salt thereof may be 70 to 100 mol %, 80 to 100 mol %, 90 to 100 mol %, 95 to 100 mol %, or 100 mol % with respect to the total amount of the monomers. "Ratio of (meth)acrylic acid and a salt thereof" means the ratio of the total amount of (meth)acrylic acid and a salt thereof.

For example, the polymer particles may be polymer particles containing a crosslinking polymer having a structural unit derived from an ethylenically unsaturated monomer, the ethylenically unsaturated monomer may include at least one compound selected from the group consisting of (meth)acrylic acid and a salt thereof, and the ratio of the (meth)acrylic acid and the salt thereof may be 70 to 100 mol % with respect to the total amount of the monomer for obtaining the polymer particles.

The ethylenically unsaturated monomer is usually preferably used as an aqueous solution. The concentration of the ethylenically unsaturated monomer in the aqueous solution containing the ethylenically unsaturated monomer (hereinafter, simply referred to as "monomer aqueous solution") is preferably 20% by mass or more and a saturated concentration or less, more preferably 25% to 70% by mass, and even more preferably 30% to 55% by mass. Examples of the water used in the aqueous solution include tap water, distilled water, and ion exchange water.

In a case where the ethylenically unsaturated monomer has an acid group, the monomer aqueous solution may be used by neutralizing the acid group with an alkaline neutralizing agent. The degree of neutralization of the ethylenically unsaturated monomer by the alkaline neutralizing agent is preferably 10 to 100 mol %, more preferably 50 to 90 mol %, and even more preferably 60 to 80 mol % of the acid group in the ethylenically unsaturated monomer from the viewpoint of increasing an osmotic pressure of the obtained polymer particles and further enhancing the water-absorbent characteristics. Examples of the alkaline neutralizing agent include alkali metal salts such as sodium hydroxide, sodium carbonate, sodium hydrogen carbonate, potassium hydroxide, and potassium carbonate; and ammonia. The alkaline neutralizing agent may be used alone or may be used in combination of two or more thereof. The alkaline neutralizing agent may be used in the form of an aqueous solution to simplify the neutralization operation. Neutralization of the acid group of the ethylenically unsaturated monomer can be performed by, for example, adding an aqueous solution of sodium hydroxide, potassium hydroxide, or the like dropwise into the above-mentioned monomer aqueous solution and mixing therewith.

In a reverse phase suspension polymerization method, a monomer aqueous solution is dispersed in a hydrocarbon dispersion medium in the presence of a surfactant, and polymerization of the ethylenically unsaturated monomer can be performed using a radical polymerization initiator or the like.

Examples of the surfactant include a nonionic surfactant, and an anionic surfactant. Examples of the nonionic surfactant include sorbitan fatty acid ester, (poly)glycerin fatty acid ester, sucrose fatty acid ester, polyoxyethylene sorbitan fatty acid ester, polyoxyethylene glycerin fatty acid ester, sorbitol fatty acid ester, polyoxyethylene sorbitol fatty acid ester, polyoxyethylene alkyl ether, polyoxyethylene alkyl phenyl ether, polyoxyethylene castor oil, polyoxyethylene hydrogenated castor oil, alkylallyl formaldehyde condensed polyoxyethylene ether, polyoxyethylene polyoxypropylene block copolymers, polyoxyethylene polyoxypropyl alkyl ether, and polyethylene glycol fatty acid ester. Examples of the anionic surfactant include fatty acid salts, alkylbenzene sulfonate, alkylmethyl taurate, polyoxyethylene alkylphenyl ether sulfate, polyoxyethylene alkyl ether sulfonate, phosphate ester of polyoxyethylene alkyl ether, and phosphate ester of polyoxyethylene alkylallyl ether. The surfactant may be used alone or may be used in combination of two or more thereof.

From the viewpoint of a good state of the W/O type reverse phase suspension, easily obtaining polymer particles having a suitable particle diameter, and industrial availability, the surfactant preferably includes at least one compound selected from the group consisting of a sorbitan fatty acid ester, a polyglycerin fatty acid ester, and a sucrose fatty acid ester. From the viewpoint easily obtaining an appropriate particle size distribution of the polymer particles, and from the viewpoint of easily improving the water-absorbent characteristics of the polymer particles and the performance of the absorbent body using the same, and the absorbent article, the surfactant preferably includes sucrose fatty acid ester, and more preferably includes sucrose stearic acid ester.

The amount of the surfactant used is preferably 0.05 to 10 parts by mass, more preferably 0.08 to 5 parts by mass, and even more preferably 0.1 to 3 parts by mass with respect to 100 parts by mass of the monomer aqueous solution from the viewpoint of obtaining a sufficient effect on the amount used and economic efficiency.

In the reverse phase suspension polymerization, a polymeric dispersant may be used in combination with the above-mentioned surfactant. Examples of the polymeric dispersant include maleic anhydride-modified polyethylene, maleic anhydride-modified polypropylene, a maleic anhydride-modified ethylene-propylene copolymer, a maleic anhydridemodified EPDM (ethylene propylene diene terpolymer), maleic anhydride-modified polybutadiene, a maleic anhydride-ethylene copolymer, a maleic anhydride-propylene copolymer, a maleic anhydride-ethylene-propylene copolymer, a maleic anhydride-butadiene copolymer, polyethylene, polypropylene, an ethylene-propylene copolymer, oxidized polyethylene, oxidized polypropylene, an oxidized ethylene-propylene copolymer, an ethylene-acrylic acid copolymer, ethyl cellulose, and ethyl hydroxyethyl cellulose. The polymeric dispersant may be used alone or may be used in combination of two or more thereof. From the viewpoint of excellent dispersion stability of the monomer, the polymeric dispersant is preferably at least one selected from the group consisting of maleic anhydride-modified polyethylene, maleic anhydride-modified polypropylene, a maleic anhydride-modified ethylene-propylene copolymer, a maleic anhydride-ethylene copolymer, a maleic anhydride-propylene copolymer, a maleic anhydride-ethylene-propylene copolymer, polyethylene, polypropylene, an ethylene-propylene copolymer, oxidized polyethylene, oxidized polypropylene, and an oxidized ethylene-propylene copolymer.

The amount of the polymeric dispersant used is preferably 0.05 to 10 parts by mass, more preferably 0.08 to 5 parts by mass, and even more preferably 0.1 to 3 parts by mass with respect to 100 parts by mass of the monomer aqueous solution from the viewpoint of obtaining a sufficient effect on the amount used and economic efficiency.

The hydrocarbon dispersion medium may include at least one compound selected from the group consisting of chain aliphatic hydrocarbons having 6 to 8 carbon atoms and alicyclic hydrocarbons having 6 to 8 carbon atoms. Examples of the hydrocarbon dispersion medium include chain aliphatic hyrdrocarbons such as n-hexane, n-heptane, 2-methylhexane, 3-methylhexane, 2,3-dimethylpentane, 3-ethylpentane, and n-octane; alicyclic hydrocarbons such as cyclohexane, methylcyclohexane, cyclopentane, methylcyclopentane, trans-1,2-dimethylcyclopentane, cis-1,3-dimethylcyclopentane, and trans-1,3-dimethylcyclopentane; and aromatic hydrocarbons such as benzene, toluene, and xylene. The hydrocarbon dispersion medium may be used alone or may be used in combination of two or more thereof.

The hydrocarbon dispersion medium may include at least one selected from the group consisting of n-heptane and cyclohexane from the viewpoint of industrial availability and stable quality. In addition, from the same viewpoint, as the mixture of the above-mentioned hydrocarbon dispersion medium, for example, commercially available Exxsol Heptane (manufactured by ExxonMobil: containing 75% to 85% of n-heptane and isomeric hydrocarbons) may be used.

The amount of the hydrocarbon dispersion medium used is preferably 30 to 1000 parts by mass, more preferably 40 to 500 parts by mass, and even more preferably 50 to 400 parts by mass with respect to 100 parts by mass of the monomer aqueous solution from the viewpoint of appropriately removing the heat of polymerization and easily controlling the polymerization temperature. In a case where the amount of the hydrocarbon dispersion medium used is 30 parts by mass or more, the polymerization temperature tends to be easily controlled. In a case where the use amount of the hydrocarbon dispersion medium is 1000 parts by mass or less, the productivity of polymerization tends to be improved, which is economical.

The radical polymerization initiator is preferably water soluble, and examples thereof include persulfates such as potassium persulfate, ammonium persulfate, and sodium persulfate; peroxides such as methyl ethyl ketone peroxide, methyl isobutyl ketone peroxide, di-t-butyl peroxide, t-butyl cumylperoxide, t-butylperoxyacetate, t-butylperoxyisobutyrate, t-butylperoxypivalate, and hydrogen peroxide; and azo compounds such as 2,2'-azobis(2-amidinopropane)dihydrochloride, 2,2'-azobis[2-(N-phenylamidino)propane]dihydrochloride, 2,2'-azobis[2-(N-allylamidino)propane]dihydrochloride, 2,2'-azobis[2-(2-imidazoline-2-yl)propane] dihydrochloride, 2,2'-azobis{2-[1-(2-hydroxyethyl)-2-imidazoline-2-yl]propane}dihydrochloride, 2,2'-azobis{2-methyl-N-[1,1-bis(hydroxymethyl)-2-hydroxyethyl] propionamide}, 2,2'-azobis[2-methyl-N-(2-hydroxyethyl)-propionamide], and 4,4'-azobis(4-cyanovaleric acid). The radical polymerization initiator may be used alone or may be used in combination of two or more thereof. As the radical polymerization initiator, at least one selected from the group consisting of potassium persulfate, ammonium persulfate, sodium persulfate, 2,2'-azobis(2-amidinopropane)dihydrochloride, 2,2'-azobis[2-(2-imidazoline-2-yl)propane]dihydrochloride, and 2,2'-azobis{2-[1-(2-hydroxyethyl)-2-imidazoline-2-yl]propane}dihydrochloride is preferable, and sodium persulfate is more preferable.

The amount of the radical polymerization initiator used may be 0.05 to 10 mmol with respect to 1 mol of the ethylenically unsaturated monomer. When the amount of the radical polymerization initiator used is 0.05 mmol or more, the polymerization reaction does not require a long time and is efficient. When the amount of the radical polymerization initiator used is 10 mmol or less, the occurrence of a rapid polymerization reaction is easily inhibited.

The above-mentioned radical polymerization initiator can also be used as a redox polymerization initiator in combination with a reducing agent such as L-ascorbic acid.

At the time of the polymerization reaction, the monomer aqueous solution used for the polymerization may include a chain transfer agent. Examples of the chain transfer agent include hypophosphites, thiols, thiolic acids, secondary alcohols, and amines.

In order to control the particle diameter of the polymer particles, the monomer aqueous solution used for the polymerization may include a thickener. Examples of the thickener include hydroxyethyl cellulose, hydroxypropyl cellulose, methyl cellulose, carboxymethyl cellulose, polyethylene glycol, polyacrylamide, polyethyleneimine, dextrin, sodium alginate, polyvinyl alcohol, polyvinylpyrrolidone, and polyethylene oxide. In a case where the stirring speed at the time of polymerization is the same, the higher the viscosity of the monomer aqueous solution, the larger the median particle diameter of the obtained particles tends to be.

Internal crosslinking by self-crosslinking may occur during polymerization, but crosslinking may be performed by using an internal crosslinking agent. When an internal crosslinking agent is used, the water-absorbent characteristics of the polymer particles are easily controlled. The internal crosslinking agent is usually added to a reaction solution during the polymerization reaction. Examples of the internal crosslinking agent include di- or tri(meth)acrylic acid esters of polyols such as ethylene glycol, propylene glycol, trimethylolpropane, glycerin, polyoxyethylene glycol, polyoxypropylene glycol, and polyglycerin; unsaturated polyesters obtained by reacting the above-mentioned polyols with unsaturated acids (such as maleic acid and fumaric acid); bis(meth)acrylamides such as N,N'-methylene bis (meth)acrylamide; di- or tri(meth)acrylic acid esters obtained by reacting polyepoxide with (meth)acrylic acid; di(meth)acrylic acid carbanil esters obtained by reacting polyisocyanate (such as tolylene diisocyanate and hexamethylene diisocyanate) with hydroxyethyl (meth)acrylate; compounds having two or more polymerizable unsaturated groups such as allylated starch, allylated cellulose, diallyl phthalate, N,N',N"-triallyl isocyanurate, and divinylbenzene; polyglycidyl compounds such as (poly)ethylene glycol diglycidyl ether, (poly)propylene glycol diglycidyl ether, (poly)glycerin diglycidyl ether, (poly)glycerin triglycidyl ether (poly)propylene glycol polyglycidyl ether, and polyglycerol polyglycidyl ether; haloepoxy compounds such as epichlorohydrin, epibromohydrin, and α-methyl epichlorohydrin; and compounds having two or more reactive functional groups such as isocyanate compounds (2,4-tolylene diisocyanate and hexamethylene diisocyanate). These internal crosslinking agents may be used alone or may be used in combination of two or more thereof. The internal crosslinking agent is preferably a polyglycidyl compound, more preferably a diglycidyl ether compound, and even more preferably at least one selected from the group consisting of (poly)ethylene glycol diglycidyl ether, (poly)propylene glycol diglycidyl ether, and (poly)glycerin diglycidyl ether.

The amount of the internal crosslinking agent used is preferred 30 mmol or less, more preferably 0.01 to 10 mmol, even more preferably 0.012 to 5 mmol, particularly preferably 0.015 to 1 mmol, extremely preferably 0.02 to 0.1 mmol, and extraordinarily preferably 0.025 to 0.08 mmol per 1 mol of the ethylenically unsaturated monomer from the viewpoint of suppressing water soluble properties by appropriately crosslinking the obtained polymer to easily obtain a sufficient water absorption amount.

It is possible to perform heating while stirring in a state of mixing a water phase containing an ethylenically unsaturated monomer, a radical polymerization initiator, and if necessary, an internal crosslinking agent, and an oil phase containing a hydrocarbon dispersion medium, a surfactant, and if necessary, a polymeric dispersant, and the like, and to perform reverse phase suspension polymerization in a water-in-oil system.

When performing the reverse phase suspension polymerization, a monomer aqueous solution containing an ethylenically unsaturated monomer is dispersed in a hydrocarbon dispersion medium in the presence of a surfactant (if necessary, additionally a polymeric dispersant). At this time, before the start of the polymerization reaction, the timing of adding the surfactant, the polymeric dispersant, or the like may be either before or after the addition of the monomer aqueous solution.

Among these, from the viewpoint of easily reducing the amount of the hydrocarbon dispersion medium remaining in the obtained polymer particles, it is preferable to perform polymerization after dispersing the monomer aqueous solution in the hydrocarbon dispersion medium in which the polymeric dispersant is dispersed and then further dispersing the surfactant.

Reverse phase suspension polymerization can be performed in one stage, or in multiple stages of two or more stages. Reverse phase suspension polymerization is preferably performed in two to three stages from the viewpoint of increasing productivity.

In a case where reverse phase suspension polymerization is performed in multiple stages of two or more stages, after a first stage reverse phase suspension polymerization is performed, an ethylenically unsaturated monomer may be added to the reaction mixture obtained in the first polymerization reaction and mixed therewith to perform second and subsequent stages of reverse phase suspension polymerization in the same method as the first stage. In the reverse phase suspension polymerization in each stage of the second and subsequent stages, in addition to the ethylenically unsaturated monomer, the above-mentioned radical polymerization initiator and/or internal crosslinking agent is preferably added in a range of a molar ratio of each component with respect to the above-mentioned ethylenically unsaturated ionomer, based on the amount of the ethylenically unsaturated monomer added at the time of the second and subsequent stages of reverse phase suspension polymerization, to perform reverse phase suspension polymerization. In the reverse phase suspension polymerization in each stage of second and subsequent stages, an internal crosslinking agent may be used if necessary. In a case of using the internal crosslinking agent, the internal crosslinking agent is preferably added within a range of the molar ratio of each component with respect to the above-mentioned ethylenically unsaturated monomer with respect to the amount of the ethylenically unsaturated monomer provided in each stage, to perform reverse phase suspension polymerization.

The temperature of the polymerization reaction varies depending on the radical polymerization initiator used, and the temperature is preferably 20° C. to 150° C., and more preferably 40° C. to 120° C. from the viewpoint of rapidly proceeding the polymerization and shortening the polymerization time to enhance economic efficiency, and easily removing polymerization heat and smoothly performing reaction. The reaction time is usually 0.5 to 4 hours. The completion of the polymerization reaction can be confirmed by, for example, stopping the temperature rise in the reaction system. Thus, the polymer of the ethylenically unsaturated monomer is usually obtained in a state of a hydrogel.

After the polymerization, a post-polymerization crosslinking agent may be added to the obtained hydrogel-like polymer and heated to perform crosslinking. By performing post-polymerization crosslinking, a degree of crosslinking of the hydrogel-like polymer can be increased, and the water-absorbent characteristics of the obtained polymer particles can be further improved.

Examples of the crosslinking agent for performing post-polymerization crosslinking include polyols such as ethylene glycol, propylene glycol, 1,4-butanediol, trimethylolpropane, glycerin, polyoxyethylene glycol, polyoxypropylene glycol, and polyglycerin; compounds having two or more epoxy groups such as (poly)ethylene glycol diglycidyl ether, (poly)propylene glycol diglycidyl ether, (poly)glycerin diglycidyl ether, (poly)glycerin triglycidyl ether, and polyglycerol polyglycidyl ether; haloepoxy compounds such as epichlorohydrin, epibromohydrin, and α-methyl epichlorohydrin; compounds having two or more isocyanate groups such as 2,4-tolylene diisocyanate, and hexamethylene diisocyanate; oxazoline compounds such as 1,2-ethylenebisoxazoline; carbonate compounds such as ethylene carbonate; and hydroxyalkylamide compounds such as bis[N,N-di(β-hydroxyethyl)]adipamide. Among these, polyglycidyl compounds such as (poly)ethylene glycol diglycidyl ether, (poly)glycerin diglycidyl ether, (poly)glycerin triglycidyl ether, (poly)propylene glycol diglycidyl ether, and polyglycerol polyglycidyl ether are preferable. The post-polymerization crosslinking agent may be used alone or may be in combination of two or more thereof.

The amount of the post-polymerization crosslinking agent may be 30 mmol or less, 10 mmol or less, or 0.01 to 5 mmol per 1 mol of the ethylenically unsaturated monomer from the viewpoint of easily obtaining suitable water-absorbent characteristics of the obtained polymer particles.

The timing of adding the post-polymerization crosslinking agent may be after the polymerization of the ethylenically unsaturated monomer used for the polymerization, and in the case of the multi-stage polymerization, it is preferable to add the crosslinking agent after the multi-stage polymerization. Considering fluctuation in water due to heat generation at the time of polymerization and after polymerization, retention due to process delay, opening of the system at the time of addition of the crosslinking agent, addition of water due to the addition of the crosslinking agent, or the like, the post-polymerization crosslinking agent is preferably added in a region from a water content immediately after polymerization +3% to a water content during a drying step of 36%.

Subsequently, the polymer particles (for example, polymer particles having a structural unit derived from an ethylenically unsaturated monomer) are obtained by drying in order to remove water from the obtained hydrogel-like polymer. Examples of a drying method include (a) a method of removing water by performing azeotropic distillation by heating from the outside in a state in which a hydrogel-like polymer is dispersed in a hydrocarbon dispersion medium, and refluxing the hydrocarbon dispersion medium, (b) a method of taking out a hydrogel-like polymer by decantation and drying under reduced pressure, and (c) a method of filtering the hydrogel-like polymer with a filter and drying tinder reduced pressure. Among these, it is preferable to use the method (a) due to the simplicity in the production step.

In the production of the polymer particles, it is preferable to perform surface crosslinking of a surface portion (a surface and the vicinity of the surface) of a hydrogel-like polymer using a crosslinking agent in a drying step (moisture removal step) or subsequent steps. By performing surface crosslinking, the water-absorbent characteristics of the polymer particles are easily controlled. The surface crosslinking is preferably performed at the timing when the hydrogel-like polymer has a specific water content. The timing of surface crosslinking is preferably when the water content of the hydrogel-like polymer is 5% to 35% by mass, more preferably when the water content of the hydrogel-like polymer is 10% to 35% by mass, and even more preferably when the water content of the hydrogel-like polymer is 15% to 30% by mass.

The water content (% by mass) of the hydrogel-like polymer is calculated by the following formula.

$$\text{Water content} = [Ww/(Ww+Ws)] \times 100$$

$Ww$: Water amount of a hydrogel-like polymer obtained by adding water amount used if necessary when mixing an inorganic reducing agent, a surface crosslinking agent, or the like to an amount obtained by subtracting water amount discharged to the outside of the system in the step such as a drying step, from water amount contained in a monomer aqueous solution before polymerization in the entire polymerization step.

$Ws$: Solid content calculated from the charged amount of materials, such as an ethylenically unsaturated monomer, a crosslinking agent, and an initiator, that constitute a hydrogel-like polymer.

Examples of the crosslinking agent (surface crosslinking agent) for performing surface crosslinking include compounds having two or more reactive functional groups. Examples of the surface crosslinking agent include polyols such as ethylene glycol, propylene glycol, 1,4-butanediol, trimethylolpropane, glycerin, polyoxyethylene glycol, polyoxypropylene glycol, and polyglycerin; polyglycidyl compounds such as (poly)ethylene glycol diglycidyl ether, (poly)glycerin diglycidyl ether, (poly)glycerin triglycidyl ether, trimethylolpropane triglycidyl ether, (poly)propylene glycol polyglycidyl ether, and (poly)glycerol polyglycidyl ether; haloepoxy compounds such as epichlorohydrin, epibromohydrin, and α-methyl epichlorohydrin; isocyanate compounds such as 2,4-tolylene diisocyanate, and hexamethylene diisocyanate; oxetane compounds such as 3-methyl-3-oxetane methanol, 3-ethyl-3-oxetane methanol, 3-butyl-3-oxetane methanol, 3-methyl-3-oxetane ethanol, 3-ethyl-3-oxetane ethanol, and 3-butyl-3-oxetane ethanol; oxazoline compounds such as 1,2-ethylenebisoxazoline; carbonate compounds such as ethylene carbonate; and hydroxyalkylamide compounds such as bis[N,N-di(β-hydroxyethyl)]adipamide. The surface crosslinking agent may be used alone, or may be used in combination of two or more thereof. The surface crosslinking agent is preferably a polyglycidyl compound, and more preferably at least one selected from the group consisting of (poly)ethylene glycol diglycidyl ether, (poly)glycerin diglycidyl ether, (poly)glycerin triglycidyl ether, (poly)propylene glycol polyglycidyl ether, and polyglycerol polyglycidyl ether.

The amount of the surface crosslinking agent used is preferably 0.01 to 20 mmol, more preferably 0.05 to 10 mmol, even more preferably 0.1 to 5 mmol, particularly preferably 0.15 to 1 mmol, and extremely preferably 0.2 to 0.5 mmol with respect to 1 mol of the ethylenically unsaturated monomer used for polymerization from the viewpoint of easily obtaining suitable water-absorbent characteristics.

After surface crosslinking, polymer particles which are surface-crosslinked dried products can be obtained by distilling water and a hydrocarbon dispersion medium by a known method, and drying tinder heating and reduced pressure, and the like.

Polymerization reaction can be performed using various stirrers having stirring blades. As the stirring blade, a flat plate blade, a lattice blade, a paddle blade, a propeller blade, an anchor blade, a turbine blade, a Pfaudler blade, a ribbon blade, a full zone blade, a max blend blade, and the like can be used.

The polymer particles according to the present embodiment can further include, for example, additional components such as a gel stabilizer, a metal chelating agent (ethylenediaminetetraacetic acid and a salt thereof, diethylenetriamine pentaacetate and a salt thereof, and the like, for example, diethylenetriamine pentasodium pentaacetate), and a flowability improver (lubricant) of the polymer particles. Additional components may be arranged inside the polymer particles, on the surface of the polymer particles, or both thereof. It is preferable that the polymer particles contain a metal chelating agent since the gel stability tends to be further enhanced.

Examples of the shape of the polymer particles according to the present embodiment and the shape of the water-absorbent resin particles according to the first embodiment include a substantially spherical shape, a crushed shape or granular shape, and a shape formed by aggregating primary particles having these shapes. The median particle diameter of the polymer particles according to the present embodiment and the water-absorbent resin particles according to the first embodiment may be 130 to 800 μm, 200 to 850 μm, 250 to 700 μm, 300 to 600 μm, or 300 to 450 μm. The polymer particles according to the present embodiment and the water-absorbent resin particles according to the first embodiment may have a desired particle size distribution at the time being obtained by a production method to be described later, but the particle size distribution may be adjusted by performing an operation such as particle size adjustment using classification with a sieve.

The amount of the physiological saline solution absorbed by the particulate water-absorbent resin composition according to the present embodiment may be 50.0 g/g or more, 53.0 g/g or more, or 55.0 g/g or more, and may be 70 g/g or less, 68 g/g or less, or 65 g/g or less from the viewpoint: of obtaining excellent gel strength. The amount of the absorbed physiological saline solution is measured by the method described in examples described later.

The particulate water-absorbent resin composition according to the present embodiment has excellent absorbency for body fluids such as urine or blood, and can be applied to the fields of, for example, sanitary products such as paper diapers, sanitary napkins, and tampons, and animal excrement treatment materials such as pet sheets, and dog or cat litters.

The particulate water-absorbent resin composition according to the present embodiment includes a plurality of silica particles arranged on the surface of the polymer particles in addition to the above-mentioned microporous inorganic material, silver or silver compound. The silica particles may be, for example, amorphous silica. For example, by mixing the polymer particles and the silica particles, the silica particles can be arranged on the surface of the polymer particles.

In a case where the particulate water-absorbent resin composition contains silica particles arranged on the surface of the polymer particles, the content of the silica particles may be, for example, 0.05% by mass or more, 0.1% by mass or more, 0.15% by mass or more, or 0.2% by mass or more, and 5.0% by mass or less, 3.0% by mass or less, 1.0% by mass or less, or 0.5% by mass or less, based on the total mass of the polymer particles.

The average particle diameter of the silica particles may be 0.1 to 50 μm, 0.5 to 30 μm, or 1 to 20 μm. The average particle diameter can be measured by a pore electric resistance method or a laser diffraction/scattering method depending on the characteristics of the particles.

Absorbent Body

The particulate water-absorbent resin composition according to the present embodiment can be suitably used for an absorbent body. The absorbent body according to the present embodiment contains the particulate water-absorbent resin composition according to the present embodiment. The content of the particulate water-absorbent resin composition in the absorbent body is preferably 100 to 1000 g (that is, 100 to 1000 g), more preferably 150 to 800 $g/m^2$, and even more preferably 200 to 700 $g/m^2$ per 1 $m^2$ of the absorbent body from the viewpoint of obtaining sufficient liquid absorption performance when the absorbent body is used for an absorbent article. From the viewpoint of exhibiting sufficient liquid absorption performance as an absorbent article, the above content is preferably 100 $g/m^2$ or more. From the viewpoint of suppressing the occurrence of the gel blocking phenomenon, the above content is preferably 1000 $g/m^2$ or less.

The absorbent body may further contain, for example, a fibrous substance in addition to the particulate water-absorbent resin composition. The absorbent body may be, for example, a mixture containing the particulate water-absorbent resin composition and the fibrous substance. The mass ratio of the particulate water-absorbent resin composition in the absorbent body may be 2% to 100%, and is preferably 10% to 80%, and more preferably 20% to 70% with respect to the total amount of the particulate water-absorbent resin composition and the fibrous substance. The configuration of the absorbent body may be, for example, a form in which the particulate water-absorbent resin composition and the fibrous substance are uniformly mixed, may be a form in which the particulate water-absorbent resin composition is sandwiched between the fibrous substances s formed in the form of a sheet or a layer, or may be other forms.

Examples of the fibrous substance include finely pulverized wood pulp, cotton, cotton linter, rayon, cellulosic fibers such as cellulose acetate, and synthetic fibers such as polyamide, polyester, and polyolefin. In addition, the fibrous substance may be a mixture of these fibers.

In order to enhance the morphological retention before and during use of the absorbent body, the fibers may be adhered to each other by adding an adhesive binder to the fibrous substance. Examples of the adhesive binder include thermal bonding synthetic fibers, hot melt adhesives, and adhesive emulsions.

Examples of the thermal bonding synthetic fiber include a total fusion type binder such as polyethylene, polypropylene, and an ethylene-propylene copolymer, and a non-total fusion type binder made of a side-by-side or core sheath structure of polypropylene and polyethylene. In the above-mentioned non-total fusion type binder, only the polyethylene portion is thermally bonded. Examples of hot melt adhesives include a mixture of a base polymer such as ethylene-vinyl acetate copolymer, styrene-isoprene-styrene block copolymer, styrene-butadiene-styrene block copolymer, styrene-ethylene-butylene-styrene block copolymer, styrene-ethylene-propylene-styrene block copolymer, and amorphous polypropylene with a tackifier, a plasticizer, an antioxidant, or the like.

Examples of the adhesive emulsion include a polymerization product of at least one or more monomers selected from the group consisting of methyl methacrylate, styrene, acrylonitrile, 2-ethylhexyl acrylate, butyl acrylate, butadiene, ethylene, and vinyl acetate. These adhesive binders may be used alone or may be used in combination of two or more thereof.

The absorbent body according to the present embodiment further contain additives such as a deodorant, a pigment, a dye, an antibacterial agent, a fragrance, and an adhesive. These additives can impart various functions to the absorbent body.

The shape of the absorbent body according to the present embodiment is not particularly limited, and may be, for example, a sheet shape. The thickness of the absorbent body (for example, the thickness of the sheet-shaped absorbent body) may be, for example, 0.1 to 20 mm and 0.3 to 15 mm.

(Absorbent Article)

An absorbent article according to the present embodiment may have, for example, a core wrap, a liquid permeable top sheet, and a liquid impermeable back sheet, in addition to the absorbent body. The core wrap retains the shape of the absorbent body. The liquid permeable top sheet is arranged on the outermost side at a side where the liquid to be absorbed enters. The liquid impermeable back sheet is arranged on the outermost side opposite to the side where the liquid to be absorbed enters.

Examples of the absorbent article include diapers (for example, paper diapers), toilet training pants, incontinence pads, sanitary products (sanitary napkins, tampons, and the like), sweat pads, pet sheets, portable toilet members, and animal excrement treatment materials.

FIG. 1 is a cross-sectional view showing an example of an absorbent article. The absorbent article 100 shown in FIG. 1 has an absorbent body 10, core wraps 20a and 20b, a liquid permeable top sheet 30, and a liquid impermeable back sheet 40. In the absorbent article 100, the liquid impermeable back sheet 40, the core wrap 20b, the absorbent body 10, the core wrap 20a, and the liquid permeable top sheet 30 are laminated in this order. In FIG. 1, there is a portion shown so that there is a gap between the members, but the members may be in close contact with each other without the gap.

The absorbent body 10 has a particulate water-absorbent resin composition 10a and a fiber layer 10b containing a fibrous substance. The particulate water-absorbent resin composition 10a is dispersed in the fiber layer 10b.

The core wrap 20a is arranged on one side of the absorbent body 10 (upper side of the absorbent body 10 in FIG. 1) in a state of being in contact with the absorbent body 10. The core wrap 20b is arranged on the other side of the absorbent body 10 (on the lower side of the absorbent body 10 in FIG. 1) in a state of being in contact with the absorbent body 10. The absorbent body 10 is arranged between the core wrap 20a and the core wrap 20b.

The core wrap 20a and the core wrap 20b each have, for example, a main surface having the same size as that of the absorbent body 10. By using the core wrap, it is possible to maintain the shape retention of the absorbent body and prevent the particulate water-absorbent resin composition and the like constituting the absorbent body from falling off and flowing. Examples of the core wrap include non-woven fabrics, woven fabrics, tissues, synthetic resin films having liquid permeation holes, net-like sheets having a mesh, and the like, and from the viewpoint of economic efficiency, a tissue formed by wet-molding pulverized pulp is preferably used.

The liquid permeable top sheet 30 is arranged on the outermost side at the side where the liquid to be absorbed enters. The liquid permeable top sheet 30 is arranged on the core wrap 20a in a state of being in contact with the core wrap 20a. The liquid permeable back sheet 40 is arranged on the outermost side at the opposite side to the liquid permeable top sheet 30 in the e absorbent article 100. The liquid impermeable back sheet 40 is arranged on the lower side of the core wrap 20b in a state of being in contact with the core wrap 20b. The liquid permeable top sheet 30 and the liquid impermeable back sheet 40 each have, for example, a main surface wider than the main surface of the absorbent body 10, and the outer edge portions of the liquid permeable top sheet 30 and the liquid impermeable back sheet 40 extend around the absorbent body 10 and the core wraps 20a and 20b.

Examples of the liquid permeable top sheet 30 include non-woven fabrics and porous sheets. Examples of the non-woven fabrics include thermal bonded non-woven fabrics, air through non-woven fabrics, resin-bonded non-woven fabrics, spunbond non-woven fabrics, meltblown non-woven fabrics, spunbond/meltblown/spunbond non-woven fabrics, air laid non-woven fabrics, spunlace non-woven fabrics, and point-bonded non-woven fabrics. Among these, thermal bonded non-woven fabrics, air through non-woven fabrics, spunbond non-woven fabrics, and spunbond/meltblown/spunbond non-woven fabrics are preferably used.

As constituent materials for the liquid permeable top sheet 30, resins or fibers known in the technical field can be used. Examples thereof include polyolefins such as polyethylene (PE) and polypropylene (PP); polyesters such as polyethylene terephthalate (PET), polytrimethylene terephthalate (PTT), and polyethylene naphthalate (PEN); polyamides such as nylon; rayon; other synthetic resins or synthetic fibers; and fibers such as cotton, silk, hemp, and pulp (cellulose), from the viewpoint of liquid permeability, flexibility, and strength when the liquid permeable top sheet is used in an absorbent article. As the constituent material, synthetic fibers are preferably used from the viewpoint of enhancing the strength of the liquid permeable top sheet 30, and among these, polyolefins and polyesters are preferable. These materials may be used alone or may be used in combination of two or more thereof.

It is desirable that the non-woven fabric used for the liquid permeable top sheet 30 has appropriate hydrophilicity from the viewpoint of improving the liquid absorption performance of the absorbent article. From this viewpoint, a non-woven fabric having a hydrophilicity of 5 to 200 is preferable and a non-woven fabric having a hydrophilicity of 10 to 150 is more preferable, where the hydrophilicity is measured according to "Hydrophilicity of Non-woven fabric" (in accordance with Pulp and Paper Test Method No. 68 (2000)) disclosed in PCT of International Publication No. WO 2011/086843. Among the above-mentioned non-woven fabrics, a non-woven fabric having such a hydrophilicity may be formed of a material, such as rayon fibers, which shows an appropriate hydrophilicity by itself, or may be formed of fibers obtained by hydrophilizing hydrophobic chemical fibers such as polyolefin fibers and polyester fibers by a known method and imparting an appropriate hydrophilicity thereto.

Examples of methods of hydrophilizing chemical fibers include a method of obtaining a non-woven fabric by a spunbond technique from a mixture in which a hydrophilizing agent is added to hydrophobic chemical fibers in a spunbond non-woven fabric, a method of using a hydrophilizing agent when producing a spunbond non-woven fabric from hydrophobic chemical fibers, and a method of obtaining a spunbond non-woven fabric from hydrophobic chemical fibers, and then impregnating the spunbond non-woven fabric with a hydrophilizing agent. As the hydrophilizing agent, the following examples are used: anionic surfactants such as aliphatic sulfonic acid salts and higher alcohol sulfuric acid ester salts: cationic surfactants such as quaternary ammonium salts; nonionic surfactants such as polyethylene glycol fatty acid esters, polyglycerin fatty acid esters, and sorbitan fatty acid esters; silicone surfactants such as polyoxyalkylenemodified silicone; stain release agents formed of polyester-based, polyamide-based, acrylic-based, or urethane-based resin; and the like.

It is preferable that a non-woven fabric used for the liquid permeable top sheet 30 be moderately bulky and have a large basis weight from the viewpoint of imparting favorable liquid permeability, flexibility, strength, and cushioning properties to an absorbent article, and accelerating a liquid penetration speed of an absorbent article. The basis weight of the non-woven fabric is preferably 5 to 200 $g/m^2$, more preferably 8 to 150 $g/m^2$, and even more preferably 10 to 100 $g/m^2$. In addition, the thickness of the non-woven fabric is preferably 20 to 1400 μm, more preferably 50 to 1200 μm, and even more preferably 80 to 1000 μm.

The liquid impermeable back sheet 40 prevents a liquid absorbed by the absorbent body 10 from leaking to the outside from the back sheet 40 side. For the liquid impermeable back sheet 40, liquid impermeable films mainly formed of polyolefin resins such as polyethylene (PE) and polypropylene (PP), breathable resin films, composite films in which a breathable resin film is bonded to a non-woven fabric such as spunbond non-woven fabric and spunlace non-woven fabric, spunbond/meltblown/spunbond (SMS) non-woven fabrics in which a water-resistant meltblown non-woven fabric is sandwiched between high strength spunbond non-woven fabrics, and the like can be used. From the viewpoint of ensuring flexibility not to impair a sensation of wearing of the absorbent article, for the back sheet 40, a resin film having a basis weight of 10 to 50 $g/m^2$ mainly formed of low density polyethylene (LDPE) resin can be used. In addition, in a case where a breathable material is used, dampness generated when wearing the absorbent article is reduced, and thereby discomfort to a wearer can be reduced.

A magnitude relationship between the absorbent body 10, the core wraps 20a and 20b, the liquid permeable top sheet 30, and the liquid impermeable back sheet 40 is not particularly limited, and is appropriately adjusted according to the usage application of the absorbent article and the like. Further, a method of retaining the shape of the absorbent body 10 using the core wraps 20a and 20b is not particularly limited. The absorbent body may be sandwiched by a plurality of the core wraps as shown in FIG. 1, or the absorbent body may be covered with one core wrap.

The absorbent body 10 may be adhered to the liquid permeable top sheet 30. By adhering the absorbent body 10 to the liquid permeable top sheet 30, a liquid is more smoothly guided to the absorbent body, and thereby it becomes easy to obtain an absorbent article that has further excellent in preventing liquid leakage. In a case where the absorbent body 10 is sandwiched or covered by the core wrap, it is preferable that at least the core wrap and the liquid permeable top sheet 30 are adhered to each other, and it is more preferable that the core wrap and the absorbent body 10 are adhered to each other. Examples of the methods of adhesion include a method of adhesion by applying a hot melt adhesive to the liquid permeable top sheet 30 in a shape such as a vertical stripe shape or a spiral shape at predetermined intervals in a width direction, and a method of adhesion using a water soluble binder selected from starch, carboxymethyl cellulose, polyvinyl alcohol, polyvinylpyrrolidone, and other water soluble polymers. In addition, a method of adhesion by thermal bonding may be adopted in a case where the absorbent body 10 contains thermal bonding synthetic fibers.

According to the present embodiment, it is possible to provide a method for producing an absorbent body using the particulate water-absorbent resin composition obtained by the above-mentioned production method. The method for producing an absorbent body according to the present embodiment includes a particle production step of obtaining a particulate water-absorbent resin composition by the above-mentioned production method. The method for producing an absorbent body according to the present embodiment may include a step of mixing the particulate water-absorbent resin composition and a fibrous substance after the particle production step. According to the present embodiment, it is possible to provide a method for producing an absorbent article using the absorbent body obtained by the above-mentioned method for producing an absorbent body. The method for producing an absorbent article according to the present embodiment includes an absorbent body production step of obtaining an absorbent body by the above-mentioned method for producing an absorbent body. The method for producing an absorbent article according to the present embodiment may include a step of obtaining the absorbent article by using the absorbent body and other constituent members of the absorbent article after the absorbent body production step. For example, in the step, the absorbent article is obtained by laminating the absorbent body and other constituent members of the absorbent article with each other.

EXAMPLES

Hereinafter, the contents of the present invention will be described in more detail using Examples and Comparative Examples, but the present invention is not limited to the following examples.

Test Example 1

Production Example 1

A round-bottomed cylindrical separable flask was prepared, which had an inner diameter of 11 cm and an internal volume of 2 L, and was equipped with a reflux condenser, a dropping funnel, a nitrogen gas introduction tube, and as a stirrer, a stirring blade having two stages of four inclined paddle blades with a blade diameter of 5 cm. Into this flask, 293 g of n-heptane as a hydrocarbon dispersion medium was put, and 0.736 g of a maleic anhydride-modified ethylene-propylene copolymer (HI-WAX 1105A, manufactured by Mitsui Chemicals, Inc.) as a polymeric dispersant was added thereto. The mixture in the flask was heated to 80° C. while being stirred to dissolve the dispersant. Thereafter, the formed solution was cooled to 50° C.

Meanwhile, 92.0 g (1.03 moles) of a 80.5% by mass acrylic acid aqueous solution as a water soluble ethylenically unsaturated monomer was put into a beaker having an internal volume of 300 mL, and 147.7 g of a 20.9% by mass sodium hydroxide aqueous solution was added dropwise thereto while cooling the beaker from the outside to perform neutralization to 75 mol %. Thereafter, 0.092 g of hydroxylethyl cellulose (HEC AW-15F, manufactured by Sumitomo Seika Chemicals Co., Ltd.) as a thickener, 0.0736 g (0.272 mmol) of potassium persulfate as a water soluble radical polymerization initiator, and 0.011 g (0.063 mmol) of ethylene glycol diglycidyl ether as an internal crosslinking agent were added and dissolved to prepare a first stage aqueous liquid.

The first stage aqueous liquid was added to the flask and stirred for 10 minutes. Separately, 0.736 g of sucrose stearic acid ester (RYOTO Sugar Ester S-370, HLB: 3, manufactured by Mitsubishi-Chemical Foods Corporation) as a surfactant was dissolved in 6.62 g of n-heptane by heating to prepare a surfactant solution. The surfactant solution was further added to the flask, and while stirring the solution at 550 rpm as a rotational speed of the stirrer, the inside of the system was sufficiently replaced with nitrogen. Thereafter, the flask was immersed in a water bath at 70° C. to raise the temperature, and polymerization was performed for 60 minutes. Thereby, a first stage polymerization slurry liquid was obtained.

Into another beaker having an internal volume of 500 mL, 128.8 g (1.44 moles) of a 80.5% by mass acrylic acid aqueous solution as a water soluble ethylenically unsaturated monomer was put, and 159.0 g of a 27% by mass sodium hydroxide aqueous solution was added dropwise thereto while cooling the beaker from the outside to perform neutralization to 75 mol %. Thereafter, 0.090 g (0.333 mmol) of potassium persulfate as a water soluble radical polymerization initiator and 0.013 g (0.075 mmol) of ethylene glycol diglycidyl ether as an internal crosslinking agent were added and dissolved to prepare a second stage aqueous liquid.

While stirring at 1,000 rpm as a rotational speed of the stirrer, the inside of the separable flask system was cooled to 25° C. Then, the total amount of the second stage aqueous liquid was added into the first stage polymerization slurry liquid, and the inside of the system was replaced with nitrogen for 30 minutes. Thereafter, the flask was immersed in a water bath at 70° C. again to raise the temperature, and a polymerization reaction was performed for 60 minutes to obtain a slurry containing a hydrogel-like polymer.

Thereafter, the flask was immersed in an oil bath set at 125° C., and 176.6 g of water was extracted out of the system while refluxing n-heptane by azeotropic distillation of n-heptane and water. Thereafter, 4.42 g of a 3% by mass sodium sulfite aqueous solution as an inorganic reducing agent and 5.89 g of a 4.5% by mass diethylenetriamine pentasodium pentaacetate aqueous solution as a chelating agent were added to the flask under stirring.

Thereafter, the flask was immersed again in an oil bath set at 125° C., and 89.1 g (total 265.7 g) of water was further extracted out of the system while refluxing n-heptane by azeotropic distillation of n-heptane and water. Thereafter, 4.42 g (0.507 mmol) of a 2 mass % ethylene glycol diglycidyl ether aqueous solution was added to the flask as a surface crosslinking agent, and the mixture was held at 83° C. for 2 hours.

Thereafter, n-heptane and water were evaporated at 125° C. and dried to obtain a dried product. This dried product was allowed to pass through a sieve having an aperture of 850 μm to obtain 222.4 g of polymer particles (dried product).

Production Example 2

220.8 g of polymer particles (dried product) were obtained in the same manner as in Production Example 1 except that the diethylenetriamine pentasodium pentaacetate aqueous solution was not used, and the amount of water extracted out of the system by the second azeotropic distillation was set to 83.4 g (total amount of 260.0 g).

Production Example 3

223.7 g of polymer particles (dried product) were obtained in the same manner as in Production Example 1 except that the sodium sulfite aqueous solution was not used, and the amount of water extracted out of the system by the second azeotropic distillation was set to 84.8 g (total amount of 261.4 g).

Production Example 4

A slurry containing a hydrogel-like polymer was obtained in the same manner as in Production Example 1. Thereafter, the flask was immersed in an oil bath set at 125° C., and 255.8 g of water was extracted out of the system while refluxing n-heptane by azeotropic distillation of n-heptane and water. Thereafter, 4.42 g (0.507 mmol) of a 2 mass % ethylene glycol diglycidyl ether aqueous solution was added to the flask as a surface crosslinking agent, and the mixture was held at 83° C. for 2 hours.

Thereafter, n-heptane and water were evaporated at 125° C. and dried to obtain a dried product. This dried product was allowed to pass through a sieve having an aperture of 850 μm to obtain 222.2 g of polymer particles (dried product).

Production of Water-Absorbent Resin Particles (Particulate Water-Absorbent Resin Composition)

Example 1

The polymer particles obtained in Production Example 1 were mixed with 0.5% by mass of amorphous silica (Tokusil NP-S, manufactured by Oriental Silicas Corporation) with respect to the mass of the polymer particles to obtain a mixture containing the amorphous silica and the polymer particles.

0.03 g of ZEOMIC HD10N (manufactured by Sinanen Zeomic Co., Ltd., synthetic zeolite, containing silver ions and zinc ions, and having an average particle diameter of 1 to 2 μm) as a microporous inorganic material was dry-blended with 100 g of the mixture to obtain water-absorbent resin particles of Example 1.

Dry blending was performed by the following method. The above mixture and the microporous inorganic material were put into a container at a predetermined ratio. The materials in the container were mixed by rotating for 30 minutes under the conditions of an autorotation speed of 50 rpm and a revolution speed of 50 rpm using a cross-rotary mixer manufactured by MEIWA KOGYO CO., LTD.

The median particle diameter of the mixture containing the amorphous silica and the polymer particles was 360 μm. The amount of the physiological saline solution absorbed by the obtained water-absorbent resin particles was 61 g/g.

Example 2

Water-absorbent resin particles of Example 2 were obtained in the same manner as in Example 1 except that 0.03 g of ZEOMIC AJ10D (manufactured by Sinanen Zeomic Co., Ltd., synthetic zeolite, containing silver ions and zinc ions, and having an average particle diameter of 2 to 3 μm) was added instead of ZEOMIC HD10N as the microporous inorganic material. The median particle diameter of the mixture containing the amorphous silica and the polymer particles was 360 μm. The amount of the physiological saline solution absorbed by the obtained water-absorbent resin particles was 61 g/g.

Example 3

Water-absorbent resin particles of Example 3 were obtained in the same manner as in Example 1 except that the polymer particles obtained in Production Example 2 were used instead of the polymer particles obtained in Production Example 1. The median particle diameter of the mixture containing the amorphous silica and the polymer particles was 350 μm. The amount of the physiological saline solution absorbed by the obtained water-absorbent resin particles was 62 g/g.

Example 4

Water-absorbent resin particles of Example 4 were obtained in the same manner as in Example 3 except that ZEOMIC AJ10D was used instead of ZEOMIC HD10N as the microporous inorganic material. The median particle diameter of the mixture containing the amorphous silica and the polymer particles was 350 μm. The amount of the physiological saline solution absorbed by the obtained water-absorbent resin particles was 62 g/g.

Example 5

Water-absorbent resin particles of Example 5 were obtained in the same manner as in Example 1 except that NOVALON AG1100 (manufactured by Toagosei Co., Ltd., sodium hydrogen zirconium phosphate, containing silver ions, and having an average particle diameter of 0.9 μm) was added instead of ZEOMIC HD10N as the microporous inorganic material. The median particle diameter of the mixture containing the amorphous silica and the polymer particles was 360 μm. The amount of the physiological saline solution absorbed by the obtained water-absorbent resin particles was 61 g/g.

Example 6

Water-absorbent resin particles of Example 6 were obtained in the same manner as in Example 1 except that DUSILITE ZH10N (manufactured by Sinanen Zeomic Co., Ltd., synthetic zeolite, containing zinc ions and having an average particle diameter of 1 to 2 μm) was added instead of ZEOMIC HD10N as the microporous inorganic material. The median particle diameter of the mixture containing the amorphous silica and the polymer particles was 360 μm. The amount of the physiological saline solution absorbed by the obtained water-absorbent resin particles was 61 g/g.

Example 7

Water-absorbent resin particles of Example 7 were obtained in the same manner as in Example 1 except that Zeolite #70 (manufactured by Nitto Funka Kogyo K. K., natural mordenite zeolite) was added instead of ZEOMIC HD10N as the microporous inorganic material. The median particle diameter of the mixture containing the amorphous silica and the polymer particles was 360 μm. The amount of the physiological saline solution absorbed by the obtained water-absorbent resin particles was 61 g/g.

Example 8

Water-absorbent resin particles of Example 8 were obtained in the same manner as in Example 1 except that 0.5 g of AO10N (manufactured by Sinanen Zeomic Co., Ltd., synthetic zeolite not carrying an antibacterial metal, an average particle diameter of 2 to 3 μm) was added instead of ZEOMIC HD10N as the microporous inorganic material. The median particle diameter of the mixture containing the amorphous silica and the polymer particles was 360 μm. The amount of the physiological saline solution absorbed by the obtained water-absorbent resin particles was 60 g/g.

Example 9

Water-absorbent resin particles of Example 9 were obtained in the same manner as in Example 8 except that the amount of AO10N added as the microporous inorganic material was changed to 0.03 g. The median particle diameter of the mixture containing the amorphous silica and the polymer particles was 360 μm. The amount of the physiological saline solution absorbed by the obtained water-absorbent resin particles was 61 g/g.

Comparative Example 1

Water-absorbent resin particles of Comparative Example 1 were obtained in the same manner as in Example 2 except that the polymer particles obtained in Production Example 3 were used instead of the polymer particles obtained in Production Example 1. The median particle diameter of the mixture containing the amorphous silica and the polymer particles was 365 μm. The amount of the physiological saline solution absorbed by the obtained water-absorbent resin particles was 61 gig.

Comparative Example 2

Water-absorbent resin particles of Comparative Example 2 were obtained in the same manner as in Example 1 except that the microporous inorganic material was not added. The median particle diameter of the mixture containing the amorphous silica and the polymer particles was 360 μm. The amount of the physiological saline solution absorbed by the obtained water-absorbent resin particles was 61 g/g.

Comparative Example 3

Water-absorbent resin particles of Comparative Example 3 were obtained in the same manner as in Example 9 except that the polymer particles obtained in Production Example 4 were used instead of the polymer particles obtained in Production Example 1. The median particle diameter of the mixture containing the amorphous silica and the polymer particles was 348 μm. The amount of the physiological saline solution absorbed by the obtained water-absorbent resin particles was 60 g/g.

Comparative Example 4

Water-absorbent resin particles of Comparative Example 4 were obtained in the same manner as in Example 1 except that the polymer particles obtained in Production Example 4 were used instead of the polymer particles obtained in Production Example 1, and the microporous inorganic material was not added. The median particle diameter of the mixture containing the amorphous silica and the polymer particles was 348 μm. The amount of the physiological saline solution absorbed by the obtained water-absorbent resin particles was 60 g/g.

Measurement of Median Particle Diameter

The median particle diameter of the particles was measured by the following procedure in an environment of room temperature (25±2° C.) and a humidity of 50±10%. That is, JIS standard sieves were combined in the following order from the top: a sieve having an aperture of 600 μm, a sieve having an aperture of 500 μm, a sieve having an aperture of 425 μm, a sieve having an aperture of 300 μm, a sieve having an aperture of 250 μm, a sieve having an aperture of 180 μm, a sieve having an aperture of 150 μm, and a receiving tray. 50 g of the particles were fed to the topmost sieve among the combination of the sieves and classified according to JIS Z8815 (1994) using a Ro-Tap shaker (manufactured by iida-seisakusho Japan Corporation). After the classification, the mass of the particles remaining on each of the sieves was calculated as a mass percentage with respect to the total amount to determine a particle size distribution. By integrating values on the sieves in descending order of the particle diameters with regard to the particle size distribution, the relationship between the aperture of the sieve and the integrated value of mass percentages of the particles remaining on the sieve was plotted on a log-probability paper. By connecting the plots on the probability paper with a straight line, the particle diameter corresponding to the integrated mass percentage of 50% by mass was obtained as the median particle diameter. Since the median particle diameter does not substantially change before and after mixing of the microporous inorganic material, the median particle diameter of the mixture containing the amorphous silica and the polymer particles measured in each Example and Comparative Example can be regarded as the median particle diameter of the water-absorbent resin particles.

Quantitative Determination of Inorganic Reducing Agent

The amount of the inorganic reducing agent (sodium sulfite) in the water-absorbent resin particles obtained in Example 1 was measured by the following method. The measurement was performed in an environment of room temperature (25±2° C.) and a humidity of 50±10%. The amount of the inorganic reducing agent in the water-absorbent resin particles obtained in Example 1 was 86 ppm.

Approximately 10 mg of the water-absorbent resin particles were collected in a polypropylene container and weighed, 30 mL of ion exchange water was added, the lid was closed, and the mixture was shaken at room temperature for 1 hour. Next, the obtained extracted liquid was filtered using a filter paper (No. 7), then the volume was determined to 100 mL using ion exchange water, and ion chromatography (IC) quantitative analysis was performed. The IC conditions were as follows:

IC device: Thermo Fisher Scientific, ICS-5000
Column: Dionex IonPac AS18-4 μm (2 mm×150 mm)

Guard column: Dionex IonPac AG18-4 μm (2 mm×30 mm)

Removal system: Dionex AERS-500 (external mode)

Detector: Electrical conductivity detector

Eluent: 17 mM KOH aqueous solution (using eluent generator EGC500)

Flow rate: 0.25 mL/min.

Sample injection volume: 100 μL

Amount of Absorbed Physiological Saline Solution (g/g)

The amount of the physiological saline solution absorbed by the water-absorbent resin particles was measured by the following method in an environment of room temperature (25±2° C.) and a humidity of 50±10%. In a 500 mL beaker, 500 g of the physiological saline solution was weighed, and while stirring at 600 r/min with a 3 cm stirrer bar (without a ring), 2.0 g of the water-absorbent resin particles were dispersed not to generate an unswollen lump. The water-absorbent resin particles were sufficiently swollen by being left to stand for 60 minutes in a stirred state. Thereafter, the mass Wa (g) of a standard sieve having an aperture of 75 pin was measured in advance, and the content in the beaker was filtered using the sieve. Then, the sieve was allowed to stand for 30 minutes in a state of being tilted at a tilt angle of about 30 degrees with respect to a horizontal plane to filter out excess water. The mass Wb (g) of the sieve containing the swollen gel was measured, and the water absorption capacity of the physiological saline solution was obtained by the following formula.

$$\text{Amount of absorbed physiological saline solution} = (Wb-Wa)/2.0$$

Gel Stability Evaluation

The gel stability of the water-absorbent resin particles obtained in Examples and Comparative Examples was evaluated by the following method.

Preparation of Artificial Urine

Artificial urine having the following composition was prepared.

Urea: 20.0 g

Sodium chloride: 8.0 g

Calcium chloride dihydrate: 0.3 g

Magnesium sulfate heptahydrate: 0.8 g

Ferrous sulfate heptahydrate: 0.05 g

Ion exchange water: 970.9 g

Preparation of Gel 49.0 g of the artificial urine was weighed into a beaker having an internal volume of 100 mL, a magnetic stirrer bar (8 mmφ×30 mm without a ring) was placed therein. The beaker was arranged on a magnetic stirrer (HS-30D, manufactured by iuchi). Subsequently, the magnetic stirrer bar was adjusted to rotate at a rate of 600 r/min. Next, 1.0 g of the water-absorbent resin particles were put into the beaker under stirring, and stirring was continued until the vortex disappeared and the liquid level became horizontal to prepare a swollen gel as a measurement sample. Immediately after preparing the swollen gel, the beaker containing the swollen gel was covered with a wrap (Diamond wrap, manufactured by Mitsubishi Chemical Corporation).

Evaluation of Gel Strength

Figure 2:
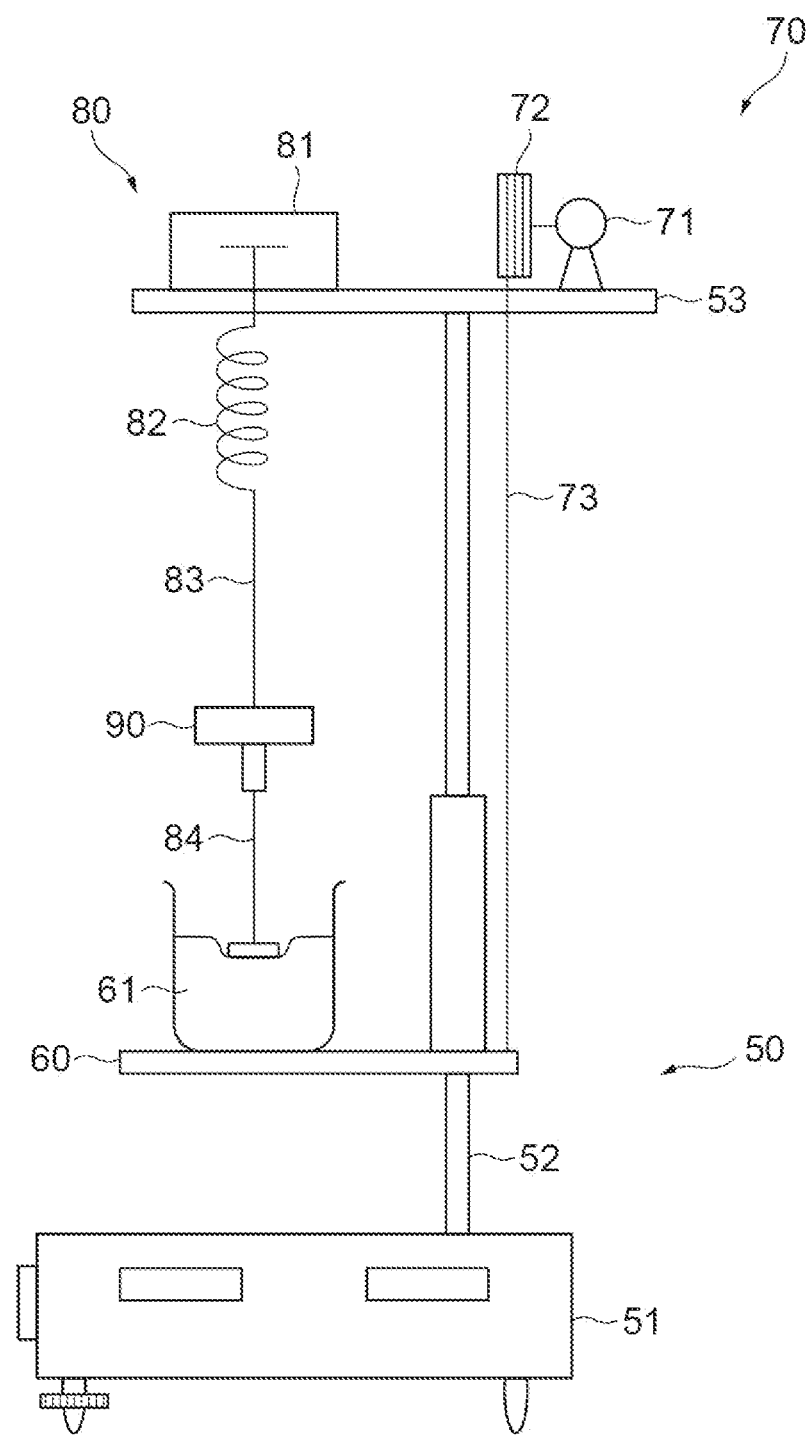
FIG. 2 is a schematic view showing a gel strength measuring device.

The gel strength was measured using a device having the measurement principle shown in FIG. 2. The device shown in FIG. 2 has a support unit 50, a movable base plate 60, a driving unit 70 for driving the movable base plate 60, and a measurement unit 80. In the support unit 50, a base 53 is fixed to an upper portion of a support pole 52 standing on a support base 51. The movable base plate 60 is attached to the support pole 52 to be vertically movable. On the movable base plate 60, a measurement sample (gel) 61 can be mounted. A pulse motor 71 is mounted on the base 53, and the movable base plate 60 is vertically moved via a wire 73 by rotating the pulley 72.

In the measurement unit 80, a pressure sensitive shaft 84 is attached to a load cell 81 for measuring distortion caused by deformation via a precision spring 82 and a connection shaft 83. The pressure sensitive shaft 84 with a disc has a disc at the tip. The diameter of the disc can be changed depending on the measurement conditions. A weight 90 can be mounted on the upper portion of the pressure sensitive shaft 84 with a disc.

The working principle of the device for measuring gel strength is as follows. The precision spring 82 is fixed to the load cell 81 (stress detector) arranged on the precision spring, and the pressure sensitive shaft 84 with a disc arranged below the precision spring is connected to the precision spring. Having a predetermined weight 90 placed thereon, the pressure sensitive shaft 84 with a disc is vertically suspended. The movable base plate 60 on which the measurement sample 61 is placed is elevated at a constant speed by the rotation of the pulse motor 71. A constant speed of load is applied to the sample 61 via the spring 82, the distortion caused by deformation is measured with the load cell 81, and then a hardness is computed by the measurement.

The gel strength value (N/m$^2$) was measured for a predetermined period of time a pressure using Curdmeter-mini (Model No. ME-600, manufactured by I. Techno Engineering Co. Ltd.) under the following measurement conditions: diameter of disc of the pressure sensitive shaft: 16 mm, load: 400 g, speed: 7 seconds/inch, and measurement mode: viscous.

After the swollen gel was left to stand at room temperature of 25±2° C. for 30 minutes from the preparation, the gel strength (initial gel strength value) was measured by the above method. In addition, in order to promote deterioration, another swollen gel prepared in the same manner was left to stand in a hot air dryer at a temperature of 40° C. for 3 hours from the preparation, and then the gel strength (the gel strength value after 3 hours) was measured. Each gel strength was measured three times, and the average value was used.

From the obtained initial gel strength value and the value after 3 hours, the gel strength change rate (%) for 3 hours was calculated by the following formula. The results are shown in Table 1. The lower the change rate, the higher the gel stability.

$$\text{Gel strength change rate (\%) for 3 hours} = [(\text{initial gel strength value} - \text{gel strength value after 3 hours})/\text{initial gel strength value}] \times 100$$

TABLE 1

| | Polymer particle | Chelating agent (DTPA) | Inorganic reducing agent | Microporous inorganic material Conc. | Metal ion | Product name | Initial gel strength value [N/m$^2$] | Gel strength value after 3 hours [N/m$^2$] | Gel strength change rate for 3 hours [%] |
|---|---|---|---|---|---|---|---|---|---|
| Ex. 1 | Production Example 1 | Added | Added | Zeolite 300 ppm | Ag, Zn | ZEOMIC HD10N | 2148 | 2031 | 5 |
| Ex. 2 | Production Example 1 | Added | Added | Zeolite 300 ppm | Ag, Zn | ZEOMIC AJ10D | 2124 | 2063 | 3 |
| Ex. 3 | Production Example 2 | — | Added | Zeolite 300 ppm | Ag, Zn | ZEOMIC HD10N | 2251 | 2138 | 5 |
| Ex. 4 | Production Example 2 | — | Added | Zeolite 300 ppm | Ag, Zn | ZEOMIC AJ10D | 2394 | 2155 | 10 |
| Ex. 5 | Production Example 1 | Added | Added | Zirconium phosphate 300 ppm | Ag | NOVALON AG1100 | 1844 | 1748 | 5 |
| Ex. 6 | Production Example 1 | Added | Added | Zeolite 300 ppm | Zn | DUSHLITE ZH10N | 1821 | 1488 | 18 |
| Ex. 7 | Production Example 1 | Added | Added | Zeolite 300 ppm | — | Zeolite #70 | 1835 | 1392 | 24 |
| Ex. 8 | Production Example 1 | Added | Added | Zeolite 0.5 wt % | — | AO10N | 2064 | 1548 | 25 |
| Ex. 9 | Production Example 1 | Added | Added | Zeolite 300 ppm | — | AO10N | 2124 | 1551 | 27 |
| Comp. Ex. 1 | Production Example 3 | Added | — | Zeolite 300 ppm | Ag, Zn | ZEOMIC AJ10D | 1918 | 1170 | 39 |
| Comp. Ex. 2 | Production Example 1 | Added | Added | — | — | — | 2475 | 1500 | 39 |
| Comp. Ex. 3 | Production Example 4 | — | — | Zeolite 300 ppm | — | AO10N | 2064 | 1302 | 37 |
| Comp. Ex. 4 | Production Example 4 | — | — | — | — | — | 2285 | 1274 | 44 |

In Comparative Examples 1 and 3 containing the microporous inorganic material but not containing the inorganic reducing agent, and Comparative Example 2 not containing the microporous inorganic material but containing the inorganic reducing agent, it was confirmed that the gel stability was slightly improved as compared with Comparative Example 4 containing neither the microporous inorganic material nor the inorganic reducing agent. On the other hand, in Examples containing the microporous inorganic material and the inorganic reducing agent, it was shown that the gel stability was remarkably improved as compared with Comparative Examples.

Further, for Example 9 and Comparative Example 1, the initial gel strength value and the value after 6 hours were measured, and the gel strength change rate after 6 hours from the initial value was calculated by the following formula. The gel strength value after 6 hours was measured in the same manner as the gel strength value after 3 hours except that the leaving time was changed to 6 hours. The results are shown in Table 2.

Gel strength change rate (%) for 6 hours=[(initial gel strength value−gel strength value after 6 hours)/initial gel strength value]×100

TABLE 2

| | Initial gel strength value [N/m$^2$] | Gel strength value after 6 hours [N/m$^2$] | Gel strength change rate for 6 hours [%] |
|---|---|---|---|
| Ex. 9 | 2031 | 1399 | 31 |
| Comp. Ex. 1 | 1930 | 830 | 57 |

In Example 9, the gel strength change rate after 6 hours remained at 31%. On the other hand, in Comparative Example 1, the gel strength change rate after 3 hours was 39%, but the gel strength change rate after 6 hours reached 57%, and it was confirmed that the deterioration further progressed remarkably.

Test Example 2

Production Example 5

A round-bottomed cylindrical separable flask was prepared, which had an inner diameter of 11 cm and an internal volume of 2 L, and was equipped with a reflux condenser, a dropping funnel, a nitrogen gas introduction tube, and as a stirrer, a stirring blade having two stages of four inclined paddle blades with a blade diameter of 5 cm. Into this flask, 293 g of n-heptane as a hydrocarbon dispersion medium was put, and 0.736 g of a maleic anhydride-modified ethylene-propylene copolymer (HI-WAX 1105A, manufactured by Mitsui Chemicals, Inc.) as a polymeric dispersant was added thereto. The mixture in the flask was heated to 80° C. while being stirred to dissolve the dispersant. Thereafter, the formed solution was cooled to 50° C.

Meanwhile, 92.0 g (1.03 moles) of a 80.5% by mass acrylic acid aqueous solution as a water soluble ethylenically unsaturated monomer was put into a beaker having an internal volume of 300 mL, and 147.7 g of a 20.9% by mass sodium hydroxide aqueous solution was added dropwise thereto while cooling the beaker from the outside to perform neutralization to 75 mol %. Thereafter, 0.092 g of hydroxylethyl cellulose (HEC AW-15F, manufactured by Sumitomo Seika Chemicals Co., Ltd.) as a thickener, 0.0736 g (0.272 mmol) of potassium persulfate as a water soluble radical polymerization initiator, and 0.011 g (0.063 mmol) of ethylene glycol diglycidyl ether as an internal crosslinking agent were added and dissolved to prepare a first stage aqueous solution.

The first stage aqueous solution was added to the flask and stirred for 10 minutes. Separately, 0.736 g of sucrose stearic acid ester (RYOTO Sugar Ester S-370, HLB: 3, manufactured by Mitsubishi-Chemical Foods Corporation) as a surfactant was dissolved in 6.62 g of n-heptane by heating to prepare a surfactant solution. The surfactant solution was further added to the flask, and while stirring the solution at 550 rpm as a rotational speed of the stirrer, the inside of the system was sufficiently replaced with nitrogen. Thereafter, the flask was immersed in a water bath at 70° C. to raise the temperature, and polymerization was performed for 60 minutes. Thereby, a first stage polymerization slurry liquid was obtained.

Into another beaker having an internal volume of 500 mL, 128.8 g (1.44 moles) of a 80.5% by mass acrylic acid aqueous solution as a water soluble ethylenically unsaturated monomer was put, and 159.0 g of a 27% by mass sodium hydroxide aqueous solution was added dropwise thereto while cooling the beaker from the outside to perform neutralization to 75 mol %. Thereafter, 0.090 g (0.333 mmol) of potassium persulfate as a water soluble radical polymerization initiator and 0.013 g (0.075 mmol) of ethylene glycol diglycidyl ether as an internal crosslinking agent were added and dissolved to prepare a second stage aqueous solution.

While stirring at 1,000 rpm as a rotational speed of the stirrer, the inside of the separable flask system was cooled to 25° C. Then, the total amount of the second stage aqueous solution was added into the first stage polymerization slurry liquid, and the inside of the system was replaced with nitrogen for 30 minutes. Thereafter, the flask was immersed in a water bath at 70° C. again to raise the temperature, and a polymerization reaction was performed for 60 minutes to obtain a slurry containing a hydrogel-like polymer.

Thereafter, the flask was immersed in an oil bath set at 125° C., and 176.6 g of water was extracted out of the system while refluxing n-heptane by azeotropic distillation of n-heptane and water. Thereafter, 4.42 g of a 3% by mass sodium sulfite aqueous solution an as an inorganic reducing agent and 5.89 g of a 4.5% by mass diethylenetriamine pentasodium pentaacetate aqueous solution as a chelating agent were added to the flask under stirring.

Thereafter, the flask was immersed again in an oil bath set at 125° C., and 89.1 g (total 265.7 g) of water was further extracted out of the system while refluxing n-heptane by azeotropic distillation of n-heptane and water. Thereafter, 4.42 g (0.507 mmol) of a 2 mass % ethylene glycol diglycidyl ether aqueous solution was added to the flask as a surface crosslinking agent, and the mixture was held at 83° C. for 2 hours.

Thereafter, n-heptane and water were evaporated at 125° C. and dried to obtain a dried product. This dried product was allowed to pass through a sieve having an aperture of 850 μm to obtain 222.4 g of polymer particles (dried product). The median particle diameter of the polymer particles was 360 μm.

Production Example 6

220.8 g of polymer particles (dried product) were obtained in the same manner as in Production Example 5 except that the diethylenetriamine pentasodium pentaacetate aqueous solution was not used, and the amount of water extracted out of the system by the second azeotropic distillation was set to 83.4 g (total amount of 260.0 g). The median particle diameter of the polymer particles was 350 μm.

Production Example 7

223.7 g of polymer particles (dried product) were obtained in the same manner as in Production Example 5 except that the sodium sulfite aqueous solution was not used, and the amount of water extracted out of the system by the second azeotropic distillation was set to 84.8 g (total amount of 261.4 g). The median particle diameter of the polymer particles was 365 μm.

Production Example 8

A slurry containing a hydrogel-like polymer was obtained in the same manner as in Production Example 5. Thereafter, the flask was immersed in an oil bath set at 125° C., and 255.8 g of water was extracted out of the system while refluxing n-heptane by azeotropic distillation of n-heptane and water. Thereafter, 4.42 g (0.507 mmol) of a 2 mass % ethylene glycol diglycidyl ether aqueous solution was added to the flask as a surface crosslinking agent, and the mixture was held at 83° C. for 2 hours.

Thereafter, n-heptane and water were evaporated at 125° C. and dried to obtain a dried product. This dried product was allowed to pass through a sieve having an aperture of 850 μm to obtain 222.2 g of polymer particles (dried product). The median particle diameter of the polymer particles was 348 μm.

Production of Particulate Water-Absorbent Resin Composition

Example 10

The polymer particles obtained in Production Example 5 were dry-blended with 0.5 parts by mass of amorphous silica (Tokusil NP-S, manufactured by Oriental Silicas Corporation) with respect to 100 parts by mass of the polymer particles to obtain a mixture containing the amorphous silica and the polymer particles.

0.5 g of silver powder (manufactured by Kanto Chemical Co., Inc., special grade, particle diameter: 45 μm or more) was dry-blended with 100 g of the mixture to obtain a particulate water-absorbent resin composition of Example 10.

Dry blending was performed by the following method. Each material to be mixed was put into a container having an internal volume of 1 L at a predetermined ratio. The materials in the container were mixed by rotating for 30 minutes under the conditions of an autorotation speed of 50 rpm and a revolution speed of 50 rpm using a cross-rotary mixer manufactured by MEIWA KOGYO CO., LTD.

The amount of the physiological saline solution absorbed by the obtained particulate water-absorbent resin composition was 61 g/g.

Example 11

A particulate water-absorbent resin composition of Example 11 was obtained in the same manner as in Example 10 except that the amount of silver powder added was changed to 0.03 g. The amount of the physiological saline solution absorbed by the obtained particulate water-absorbent resin composition was 61 g/g.

Example 12

A particulate water-absorbent resin composition of Example 12 was obtained in the same as in Example 10 except that 0.5 g of silver (I) chloride (manufactured by Kanto Chemical Co., Inc., special grade, particle diameter: 300 μm or less) was used instead of the silver powder. The amount of the physiological saline solution absorbed by the obtained particulate water-absorbent resin composition was 61 g/g.

Example 13

A particulate water-absorbent resin composition of Example 13 was obtained in the same manner as in Example 12 except that the amount of silver (I) chloride added was changed to 0.03 g. The amount of the physiological saline solution absorbed by the obtained particulate water-absorbent resin composition was 61 g/g.

Example 14

A particulate water-absorbent resin composition of Example 14 was obtained in the same as in Example 10 except that 0.5 g of silver (I) oxide (manufactured by Kanto Chemical Co., Inc., special grade, particle diameter: about 500 μm) was used instead of the silver powder. The amount of the physiological saline solution absorbed by the obtained particulate water-absorbent resin composition was 61 g/g.

Example 15

A particulate water-absorbent resin composition of Example 15 was obtained in the same manner as in Example 14 except that the amount of silver (I) oxide added was changed to 0.03 g. The amount of the physiological saline solution absorbed by the obtained particulate water-absorbent resin composition was 61 g/g.

Example 16

A particulate water-absorbent resin composition of Example 16 was obtained in the same manner as in Example 11 except that the polymer particles obtained in Production Example 6 were used instead of the polymer particles obtained in Production Example 5. The amount of the physiological saline solution absorbed by the obtained particulate water-absorbent resin composition was 62 g/g.

Example 17

A particulate water-absorbent resin composition of Example 17 was obtained in the same manner as in Example 10 except that 0.03 g (5 ppm in terms of an amount of silver element added) of ZEOMIC HD10N (manufactured by Sinanen Zeomic Co., Ltd., synthetic zeolite, containing silver ions and zinc ions and having an average particle diameter of 1 to 2 μm) was used instead of the silver powder as silver-carrying zeolite. The amount of the physiological saline solution absorbed by the obtained particulate water-absorbent resin composition was 61 g/g. The initial gel strength value was 2148 N/m², the gel strength value after 3 hours was 2031 N/m², and the gel strength change rate for 3 hours was 5%.

Comparative Example 5

A particulate water-absorbent resin composition of Comparative Example 5 was obtained in the same manner as in Example 11 except that the polymer particles obtained in Production Example 7 were used instead of the polymer particles obtained in Production Example 5. The amount of the physiological saline solution absorbed by the obtained particulate water-absorbent resin composition was 61 g/g.

Comparative Example 6

A particulate water-absorbent resin composition of Comparative Example 6 was obtained in the same manner as in Example 10 except that silver powder was not added. The amount of the physiological saline solution absorbed by the obtained particulate water-absorbent resin composition was 61 g/g.

Comparative Example 7

A particulate water-absorbent resin composition of Comparative Example 7 was obtained in the same manner as in Example 10 except that the polymer particles obtained in Production Example 8 were used instead of the polymer particles obtained in Production Example 5, and the silver powder was not added. The amount of the physiological saline solution absorbed by the obtained particulate water-absorbent resin composition was 60 g/g.

Measurement of Median Particle Diameter

The median particle diameter of the particles was measured by the following procedure. That is, JIS standard sieves were combined in the following order from the top: a sieve having an aperture of 600 μm, a sieve having an aperture of 500 μm, a sieve having an aperture of 425 μm, a sieve having an aperture of 300 μm, a sieve having an aperture of 250 μm, a sieve having an aperture of 180 μm, a sieve having an aperture of 150 μm, and a receiving tray. 50 g of the particles were fed to the topmost sieve among the combination of the sieves and classified according to JIS Z8815 (1994) using a Ro-Tap shaker (manufactured by iida-seisakusho Japan Corporation). After the classification, the mass of the particles remaining on each of the sieves was calculated as a mass percentage with respect to the total amount to determine a particle size distribution. By integrating values on the sieves in descending order of the particle diameters with regard to the particle size distribution, the relationship between the aperture of the sieve and the integrated value of mass percentages of the particles remaining on the sieve was plotted on a log-probability paper. By connecting the plots on the probability paper with a straight line, the particle diameter corresponding to the integrated mass percentage of 50% by mass was obtained as the median particle diameter.

Quantitative Determination of Inorganic Reducing Agent

The amount of the inorganic reducing agent (sodium sulfite) in the polymer particles obtained in Production Example 5 was measured by the following method. The amount of the inorganic reducing agent in the polymer particles obtained in Production Example 5 was 87 ppm.

Approximately 10 mg of the particles were collected in a polypropylene container and weighed, 30 mL of ion exchange water was added, the lid was closed, and the mixture was shaken at room temperature for 1 hour. Next, the obtained extracted liquid was filtered using a filter paper (No. 7), then the volume was determined to 100 mL using ion exchange water, and ion chromatography (IC) quantitative analysis was performed. The IC conditions were as follows.

IC device: Thermo Fisher Scientific, ICS-5000
Column: Dionex IonPac AS18-4 μm (2 mm×150 mm)
Guard column: Dionex IonPac AG8-4 μm (2 mm×30 mm)
Removal system: Dionex AERS-500 (external mode)
Detector: Electrical conductivity detector Eluent: 17 mM KOH aqueous solution (using eluent generator EGC500)
Flow rate: 0.25 mL/min.
Sample injection volume: 100 μL Amount of Absorbed Physiological Saline Solution (g/g)

The amount of physiological saline solution absorbed by the particulate water-absorbent resin composition was measured by the following method in an environment of room temperature (25±2° C.) and a humidity of 50±10%. In a 500 mL beaker, 500 g of the physiological saline solution was weighed, and while stirring at 600 r/min with a 3 cm stirrer bar (without a ring), 2.0 g of the particulate water-absorbent resin composition was dispersed not to generate an unswollen lump. The mixture was left to stand for 60 minutes in a stirred state to sufficiently swell the polymer particles in the particulate water-absorbent resin composition. Thereafter, the mass Wa (g) of a standard sieve having an aperture of 75 μm was measured in advance, and the content in the beaker was filtered using the sieve. Then, the sieve was allowed to stand for 30 minutes in a state of being tilted at a tilt angle of about 30 degrees with respect to a horizontal plane to filter out excess water. The mass Wb (g) of the sieve containing the swollen gel was measured, and the water absorption capacity of the physiological saline solution was obtained by the following formula.

Amount of absorbed physiological saline solution= (Wb−Wa)/2.0

Gel Stability Evaluation

The gel stability of the particulate water-absorbent resin compositions obtained in Test Example 2 and Comparative Example was evaluated in the same manner as in Test Example 1. From the obtained initial gel strength value and the value after 3 hours, the gel strength change rate (%) for 3 hours was calculated by the following formula. The results are shown in Table 4. The lower the change rate, the higher the gel stability.

Gel strength change rate (%) for 3 hours=[(initial gel strength value−gel strength value after 3 hours)/ initial gel strength value]×100

TABLE 3

Particulate water-absorbent resin composition

| | Polymer particle | | Silver or silver compound | |
| --- | --- | --- | --- | --- |
| Production Example | Chelating agent (DTPA) | Inorganic reducing agent | Amount of silver element added [ppm] | Kind of additive |
| Ex. 10 | 5 | Added | Added | 5000 | Silver powder |
| Ex. 11 | 5 | Added | Added | 300 | Silver powder |
| Ex. 12 | 5 | Added | Added | 3763 | Silver (I) chloride |
| Ex. 13 | 5 | Added | Added | 226 | Silver (I) chloride |
| Ex. 14 | 5 | Added | Added | 4655 | Silver (I) oxide |
| Ex. 15 | 5 | Added | Added | 279 | Silver (I) oxide |
| Ex. 16 | 6 | — | Added | 300 | Silver powder |
| Comp. Ex. 5 | 7 | Added | — | 300 | Silver powder |
| Comp. Ex. 6 | 5 | Added | Added | — | — |
| Comp. Ex. 7 | 8 | — | — | — | — |

TABLE 4

Gel stability evaluation

| | Initial gel strength value [N/m$^2$] | Gel strength value after 3 hours [N/m$^2$] | Gel strength change rate for 3 hours [%] |
| --- | --- | --- | --- |
| Ex. 10 | 1820 | 1540 | 15 |
| Ex. 11 | 1788 | 1415 | 21 |
| Ex. 12 | 1797 | 1382 | 23 |
| Ex. 13 | 1689 | 1327 | 21 |
| Ex. 14 | 1666 | 1383 | 17 |
| Ex. 15 | 1940 | 1545 | 20 |
| Ex. 16 | 1842 | 1448 | 21 |
| Comp. Ex. 5 | 1621 | 908 | 44 |
| Comp. Ex. 6 | 1684 | 1025 | 39 |
| Comp. Ex. 7 | 1670 | 935 | 44 |

It was shown that in Examples in which the particulate water-absorbent resin composition contained the polymer particles containing the inorganic reducing agent and the silver or silver compound, the gel stability was remarkably improved as compared with Comparative Examples.

REFERENCE SIGNS LIST

10: Absorbent body, 10a: Particulate water-absorbent resin composition, 10b: Fiber layer, 20a, 20b: Core wrap, 30: Liquid permeable top sheet, 40: Liquid impermeable back sheet, 50: Support unit, 51: Support base, 52: Support pole, 53: Base, 60: Movable base plate, 61: Measurement sample, 70: Driving unit, 71: Pulse motor, 72: Pulley, 73: Wire, 80: Measurement unit, 81: Load cell, 82: Precision spring, 83: Connection shaft, 84: Pressure sensitive shaft with disc, 90: Weight, 100: Absorbent article

The invention claimed is:

1. A particulate water-absorbent resin composition comprising:
    at least one material selected from the group consisting of a microporous inorganic material, silver, and a silver compound; and
    a polymer particle,
    wherein the polymer particle comprises an inorganic reducing agent contained inside the polymer particle, and
    a content of the inorganic reducing agent is from 0.003% to 0.1% by mass with respect to a total amount of the polymer particles.

2. The particulate water-absorbent resin composition according to claim 1,
    wherein the particulate water-absorbent resin composition comprises the microporous inorganic material, and
    the microporous inorganic material comprises at least one material selected from the group consisting of zeolite and zirconium phosphate.

3. The particulate water-absorbent resin composition according to claim 1,
    wherein the particulate water-absorbent resin composition comprises the microporous inorganic material, and
    the microporous inorganic material comprises an antibacterial metal ion.

4. The particulate water-absorbent resin composition according to claim 1,
    wherein the particulate water-absorbent resin composition comprises the silver or the silver compound, and the silver or the silver compound is at least one material selected from the group consisting of silver powder, silver (I) chloride, and silver (I) oxide.

5. An absorbent body comprising:
the particulate water-absorbent resin composition according to claim 1.

6. An absorbent article comprising:
the absorbent body according to claim 5.

7. The absorbent article according to claim 6, which is a diaper.

8. The particulate water-absorbent resin composition according to claim 1, wherein the particulate water-absorbent resin composition comprises the microporous inorganic material and a content of the microporous inorganic material in the particulate water-absorbent resin composition is 0.001 to 3 parts by mass.

9. The particulate water-absorbent resin composition according to claim 1, wherein the particulate water-absorbent resin composition comprises the microporous inorganic material and a content of the microporous inorganic material in the particulate water-absorbent resin composition is 0.01 to 1 parts by mass.

10. The particulate water-absorbent resin composition according to claim 1, wherein the particulate water-absorbent resin composition comprises the silver or the silver compound and the content of the silver element in the particulate water-absorbent resin composition is 0.0001% to 3% by mass.

11. The particulate water-absorbent resin composition according to claim 1, wherein the polymer particle is a crosslinking polymer obtained by polymerizing a monomer containing an ethylenically unsaturated monomer, wherein the ethylenically unsaturated monomer comprises at least one compound selected from the group consisting of (meth) acrylic acid and a salt thereof, 2-(meth)acrylamide-2-methylpropanesulfonic acid and a salt thereof, (meth)acrylamide, N,N-dimethyl (meth)acrylamide, 2-hydroxyethyl(meth) acrylate, N-methylol (meth)acrylamide, polyethylene glycol mono(meth)acrylate, N,N-diethylaminoethyl (meth)acrylate, N,N-diethylaminopropyl (meth)acrylate, and diethylaminopropyl (meth)acrylamide.

12. The particulate water-absorbent resin composition according to claim 1, wherein the inorganic reducing agent comprises at least one compound selected from the group consisting of sulfite, hydrogen sulfite, pyrosulfite, dithionite, trithionate, tetrathionate, thiosulfate, and sodium hypophosphite.

13. The particulate water-absorbent resin composition according to claim 1, wherein when the particulate water-absorbent resin composition is swollen by being stirred in an artificial urine and kept at 40° C. for 3 hours, the water-absorbent resin composition exhibits a gel strength change rate of a swollen particulate water-absorbent resin composition of 27% or lower.

* * * * *